(12) United States Patent
Mizuta et al.

(10) Patent No.: US 10,456,665 B2
(45) Date of Patent: Oct. 29, 2019

(54) INFORMATION PROCESSING SYSTEM, NON-TRANSITORY STORAGE MEDIUM HAVING INFORMATION PROCESSING PROGRAM STORED THEREIN, INFORMATION PROCESSING APPARATUS, AND INFORMATION PROCESSING METHOD

(71) Applicant: NINTENDO CO., LTD., Kyoto (JP)

(72) Inventors: Masato Mizuta, Kyoto (JP); Yusuke Akifusa, Kyoto (JP); Yuki Hashizume, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 110 days.

(21) Appl. No.: 15/726,708

(22) Filed: Oct. 6, 2017

(65) Prior Publication Data

US 2018/0178114 A1    Jun. 28, 2018

(30) Foreign Application Priority Data

Dec. 28, 2016   (JP) .................................. 2016-255278

(51) Int. Cl.
*G07F 17/32*     (2006.01)
*A63F 13/211*    (2014.01)
(Continued)

(52) U.S. Cl.
CPC .......... *A63F 13/211* (2014.09); *A63F 13/285* (2014.09); *A63F 13/92* (2014.09);
(Continued)

(58) Field of Classification Search
USPC ........................................................ 463/46
See application file for complete search history.

(56) References Cited

U.S. PATENT DOCUMENTS

2013/0296053 A1*  11/2013  Rasmussen ............. G07F 17/32
                                                       463/31
2016/0048209 A1*   2/2016  Park ...................... G06F 1/1626
                                                       345/173
(Continued)

FOREIGN PATENT DOCUMENTS

JP    2008-000345     1/2008
WO    2016/136934     9/2016

OTHER PUBLICATIONS

Office Action dated Jun. 26, 2019 in Japanese Application No. 2016-255278, 4 pages.

*Primary Examiner* — Pierre E Elisca
(74) *Attorney, Agent, or Firm* — Nixon & Vanderhye PC

(57) ABSTRACT

A determination section determines whether or not contact of an object has occurred, based on an orientation, of a controller, calculated by an orientation calculation section. A first waveform generation section generates a first vibration waveform when the determination section determines that the contact of the object has occurred. An audio vibration waveform generation section generates an audio vibration waveform based on a sound signal. An output section outputs the sound signal and outputs a signal representing a combined waveform obtained by the first vibration waveform and the audio vibration waveform based on the sound signal being combined with each other, when the determination section determines that the contact of the object has occurred.

28 Claims, 17 Drawing Sheets

(51) Int. Cl.
*A63F 13/92* (2014.01)
*A63F 13/285* (2014.01)

(52) U.S. Cl.
CPC ...... *G07F 17/3209* (2013.01); *G07F 17/3218* (2013.01); *H04R 2400/03* (2013.01); *H04R 2499/11* (2013.01)

(56) References Cited

U.S. PATENT DOCUMENTS

2017/0293361 A1* 10/2017 Lee .................. G06F 3/016
2018/0243647 A1    8/2018 Komori et al.
2018/0301001 A1* 10/2018 Knott ................ G06N 3/084

* cited by examiner

F I G. 6
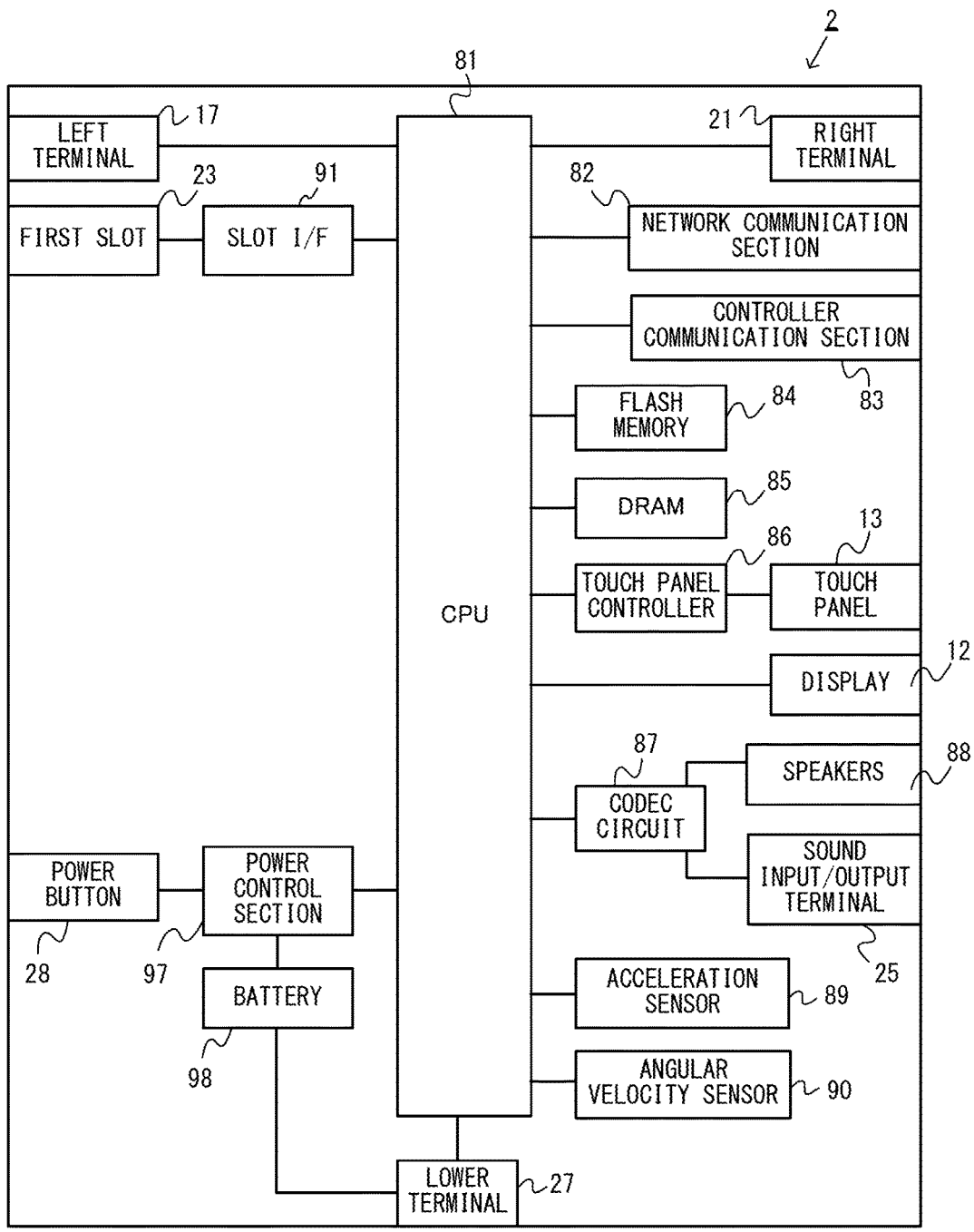

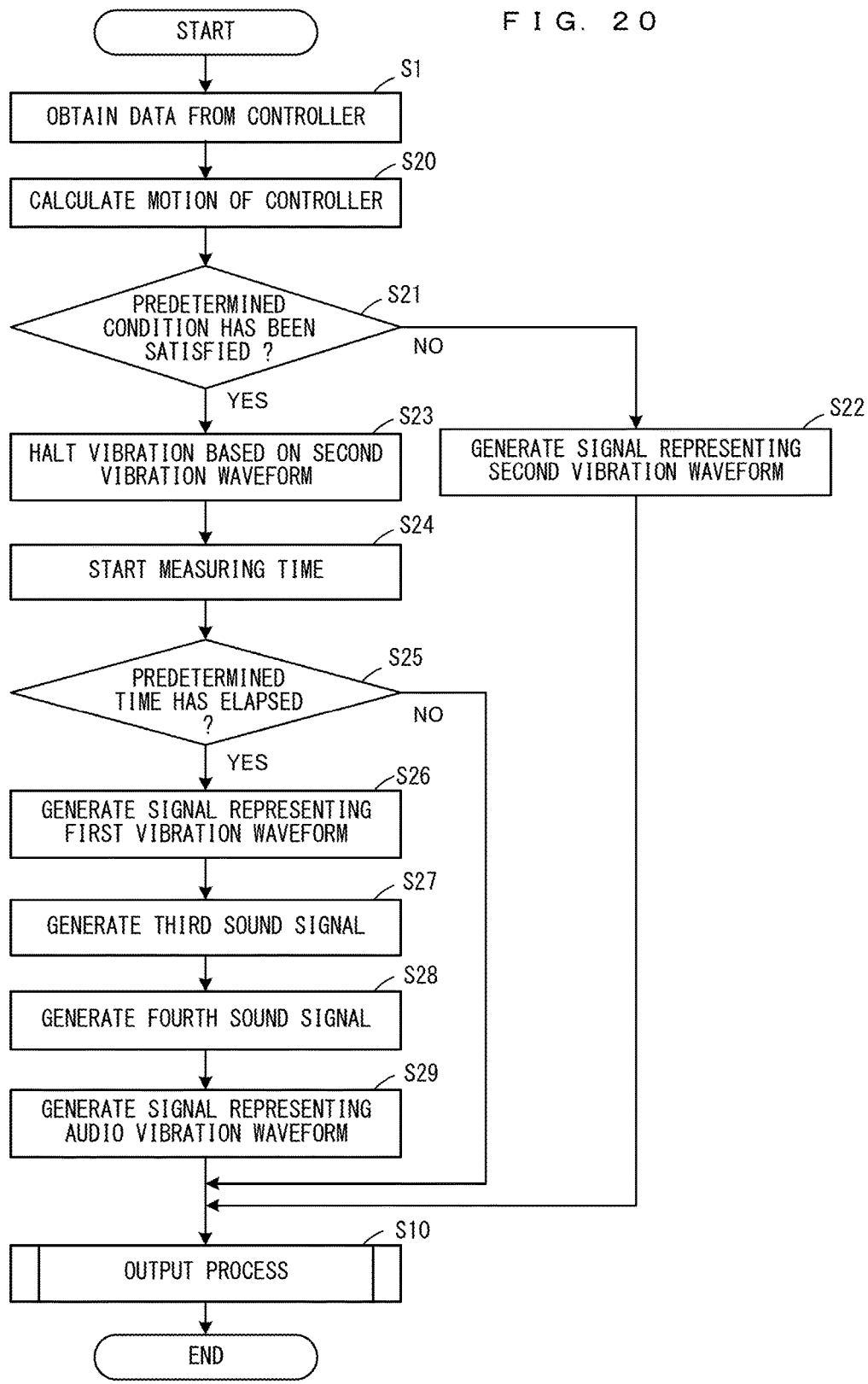

INFORMATION PROCESSING SYSTEM, NON-TRANSITORY STORAGE MEDIUM HAVING INFORMATION PROCESSING PROGRAM STORED THEREIN, INFORMATION PROCESSING APPARATUS, AND INFORMATION PROCESSING METHOD

CROSS REFERENCE TO RELATED APPLICATION

The disclosures of Japanese Patent Application No. 2016-255278, filed on Dec. 28, 2016, are incorporated herein by reference.

FIELD

The technique shown here relates to an information processing system, a non-transitory storage medium having an information processing program stored therein, an information processing apparatus, and an information processing method.

BACKGROUND AND SUMMARY

To date, a technique in which a position on a screen is designated by using an input device, and the input device is vibrated when a predetermined place is designated, has been known.

However, in the above-described conventional technique, occurrence or non-occurrence of vibration is merely controlled according to the designated position, and vibration feedback has not been sufficiently realistically performed.

Therefore, an object of the exemplary embodiment is to provide an information processing system capable of allowing a user to more realistically perceive vibration.

In order to attain the aforementioned object, the exemplary embodiment has the following configuration.

One aspect of the exemplary embodiment is an information processing system that includes an operation section, a vibration section, an information processing section, a sound generation section, and an output section. The vibration section is configured to vibrate according to an input signal representing a vibration waveform. The information processing section is configured to perform information processing based on an input from the operation section. The sound generation section is configured to generate a sound signal. The waveform generation section is configured to generate a signal representing a first vibration waveform. The output section is configured to output the sound signal, and to output, to the vibration section, a signal representing a combined waveform obtained by the first vibration waveform and an audio vibration waveform based on a waveform of the sound signal being combined with each other, based on the information processing.

A "signal representing a vibration waveform" may be, for example, an amplitude and a frequency of a vibration waveform. Further, a "signal representing a vibration waveform" may be a vibration waveform itself, or may be a signal that designates vibration pattern data representing a vibration waveform.

Further, "the first vibration waveform and the audio vibration waveform are combined with each other" may mean that, for example, the total of amplitudes of two vibration waveforms is obtained, and that, for example, an average of frequencies of two vibration waveforms is obtained (the average may be a weighted average or unweighted average). Further, "the first vibration waveform and the audio vibration waveform are combined with each other" may mean that, for example, two vibration waveforms are superposed on each other according to the superposition principle of waves.

In the above-described configuration, a combined waveform obtained by the first vibration waveform and the audio vibration waveform based on a sound signal being combined with each other can be output as well as a sound is output, and a user is allowed to perceive sound and vibration corresponding to the sound, and to perform more realistic vibration experience.

Further, the output section may output, to the vibration section, the signal representing the combined waveform at a time when output of the sound signal is started.

In the above-described configuration, at a time when the sound is output, vibration based on the sound can be performed.

Further, the information processing section may determine whether or not a certain condition is satisfied in the information processing. When it is determined that the condition has been satisfied in the information processing, the waveform generation section may generate the first vibration waveform, the sound generation section may generate the sound signal, and the output section may output the sound signal and output the signal representing the combined waveform. Further, when it is determined that the condition is not satisfied in the information processing, the waveform generation section may generate a second vibration waveform that is equal to the first vibration waveform, and the output section may output a signal representing the second vibration waveform.

In the above-described configuration, the vibration can be made the same between before the condition is satisfied, and when the condition has been satisfied, and, when the condition has been satisfied, the combined waveform can be output together with the sound signal.

Further, the information processing section may determine whether or not a certain condition is satisfied in the information processing. When it is determined that the condition has been satisfied in the information processing, the waveform generation section may generate the first vibration waveform, the sound generation section may generate the sound signal, and the output section may output the sound signal and output the signal representing the combined waveform. Further, when it is determined that the condition is not satisfied in the information processing, the waveform generation section may generate a second vibration waveform that is different from the first vibration waveform, and the output section may output a signal representing the second vibration waveform.

In the above-described configuration, the vibration can be made different between before the condition is satisfied, and when the condition has been satisfied, and, when the condition has been satisfied, the combined waveform can be output together with the sound signal.

Further, the first vibration waveform may be a waveform obtained by changing a frequency and/or an amplitude of the second vibration waveform.

In the above-described configuration, vibration based on the second vibration waveform can be performed before the condition is satisfied, and vibration based on the first vibration waveform obtained by changing the second vibration waveform can be performed when the condition has been satisfied. For example, data representing the second vibration waveform is previously stored, and, when the condition has been satisfied, the first vibration waveform can be generated by using the same data, whereby an amount of data to be previously stored can be reduced.

Further, the operation section may include an inertial sensor, and input from the operation section may include data obtained from the inertial sensor. The information processing section may determine whether or not a first virtual object contacts with a second virtual object, in the information processing, based on the data obtained from the inertial sensor. The output section may output the sound signal and output, to the vibration section, the signal representing the combined waveform when it is determined that the first virtual object has contacted with the second virtual object.

In the above-described configuration, whether or not contact with the second virtual object occurs is determined based on the data from the inertial sensor, and, according to the result of the determination as to the contact, the sound signal can be output, and vibration based on the combined waveform can be performed.

Further, the number of the second virtual objects may be plural. The output section may output a signal representing a combined waveform obtained by the first vibration waveform and a plurality of the audio vibration waveforms being combined with each other, when it is determined that the first virtual object has contacted with a plurality of the second virtual objects.

In the above-described configuration, in a case where the first virtual object has contacted with a plurality of the second virtual objects, a plurality of the audio vibration waveforms can be combined with each other, and vibration can be made stronger.

Further, the waveform generation section may generate a signal representing the first vibration waveform by setting a frequency and an amplitude. The vibration section may vibrate at the frequency and the amplitude having been set.

In the above-described configuration, a frequency and an amplitude can be designated to vibrate the vibration section. For example, a frequency at which the vibration section easily vibrates, can be designated to vibrate the vibration section.

Further, the waveform generation section may set, as the frequency, a resonance frequency of the vibration section.

In the above-described configuration, the vibration section can be vibrated by designating a resonance frequency, and the vibration section can be easily vibrated more strongly.

Further, the output section may output a signal representing the second vibration waveform before it is determined that the condition is satisfied. The output section may reduce an amplitude of the second vibration waveform according to the condition being determined to be satisfied. The output section may output a signal representing the combined waveform after elapse of a certain time.

In the above-described configuration, vibration based on the second vibration waveform can be performed before the condition is satisfied, and vibration based on the combined waveform can be performed after the vibration based on the second vibration waveform is inhibited in a case where the condition has been satisfied. For example, vibration of the vibration section can be reduced or halted according to the condition being satisfied, and a user is allowed to more easily perceive vibration based on the combined waveform which is generated when the condition has been satisfied.

Another aspect is an information processing system that includes an operation section, a vibration section, an information processing section, a waveform generation section, and an output section. The vibration section is configured to vibrate according to an input signal representing a vibration waveform. The information processing section is configured to perform information processing based on an input from the operation section. The waveform generation section is configured to generate a signal representing a first vibration waveform for which a predetermined frequency is set. The output section is configured to output, to the vibration section, a signal representing a combined waveform obtained by the first vibration waveform and an audio vibration waveform based on a waveform of a sound signal being combined with each other, based on the information processing.

In the above-described configuration, the vibration section can be vibrated based on a combined waveform obtained by combining the first vibration waveform for which a predetermined frequency is set, with an audio vibration waveform based on a sound signal. For example, the vibration section can be vibrated by designating a frequency at which the vibration section easily vibrates.

Further, the predetermined frequency may be a resonance frequency of the vibration section.

In the above-described configuration, a resonance frequency can be designated to vibrate the vibration section. Thus, the vibration section can be more strongly vibrated.

Another aspect is an information processing system that includes an operation section, a vibration section, a determination section, a first waveform generation section, a second waveform generation section, and an output section. The vibration section is configured to vibrate according to an input signal representing a vibration waveform. The determination section is configured to determine whether or not a certain condition is satisfied, based on an input from the operation section. The first waveform generation section is configured to generate a signal representing a first vibration waveform. The second waveform generation section is configured to generate a signal representing a second vibration waveform. The output section is configured to output, to the vibration section, a signal representing the second vibration waveform before the condition is satisfied, reduce an amplitude of the second vibration waveform according to the condition being determined to be satisfied, and output, to the vibration section, a signal representing the first vibration waveform after elapse of a certain time.

In the above-described configuration, vibration based on the second vibration waveform can be performed before the condition is satisfied, and vibration based on the first vibration waveform can be performed after the vibration based on the second vibration waveform is inhibited in a case where the condition has been satisfied. For example, vibration of the vibration section can be reduced or halted according to the condition being satisfied, and a user is allowed to more easily perceive vibration based on the first vibration waveform which is generated when the condition has been satisfied.

Further, an amplitude of the first vibration waveform may be greater than an amplitude of the second vibration waveform.

In the above-described configuration, vibration based on the second vibration waveform can be inhibited according to the condition being satisfied, and a strong vibration based on the first vibration waveform can be performed after elapse of a certain time.

Further, another aspect may be an information processing program executed by a computer of an information processing apparatus that vibrates a vibration section which vibrates according to an input signal representing a vibration waveform. The information processing program causes the computer to execute: an information processing step of performing information processing based on an input from an operation section; a sound generation step of generating a sound signal; a waveform generation step of generating a signal representing a first vibration waveform; and an output step of outputting the sound signal, and outputting, to the vibration section, a signal representing a combined waveform obtained by the first vibration waveform and an audio vibration waveform based on a waveform of the sound signal being combined with each other, based on the information processing.

Further, another aspect may be an information processing apparatus that executes the information processing program. Moreover, another aspect may be an information processing method performed by the information processing apparatus or the information processing system.

According to the exemplary embodiment, a user is allowed to perform more realistic vibration experience.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 6 is an example non-limiting block diagram showing an example of an internal configuration of the main body apparatus 2;

FIG. 20 is an example non-limiting flow chart showing in detail a process performed by the main body apparatus 2 when the second game is performed.

DETAILED DESCRIPTION OF NON-LIMITING EXAMPLE EMBODIMENTS

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the left controller 3 and the right controller 4 are attached to the main body apparatus 2 and used as a unified apparatus. Further, the main body apparatus 2, the left controller 3, and the right controller 4 can also be used as separate bodies (see FIG. 2). Hereinafter, first, the hardware configuration of the game system according to the exemplary embodiment is described, and then, the control of the game system according to the exemplary embodiment is described.

(Description for Main Body Apparatus, Left Controller, and Right Controller)

Figure 1:
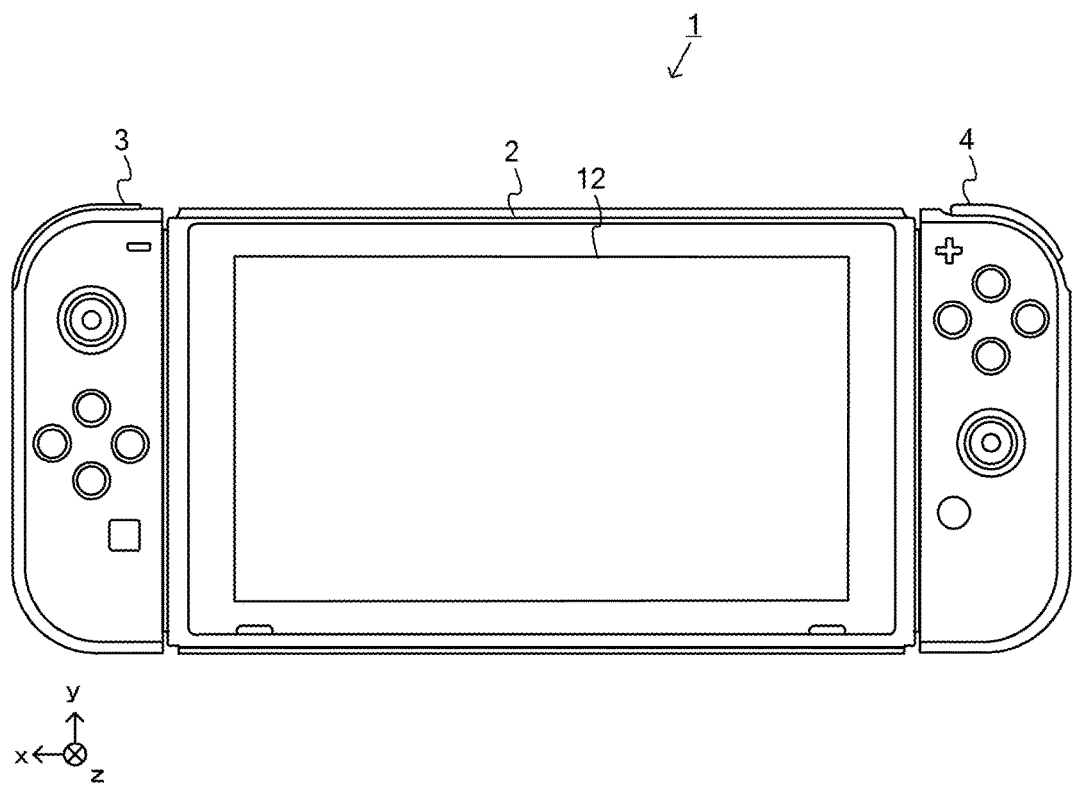
FIG. 1 is an example non-limiting diagram showing a state where a left controller 3 and a right controller 4 are attached to a main body apparatus 2.

FIG. 1 is a diagram showing a state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
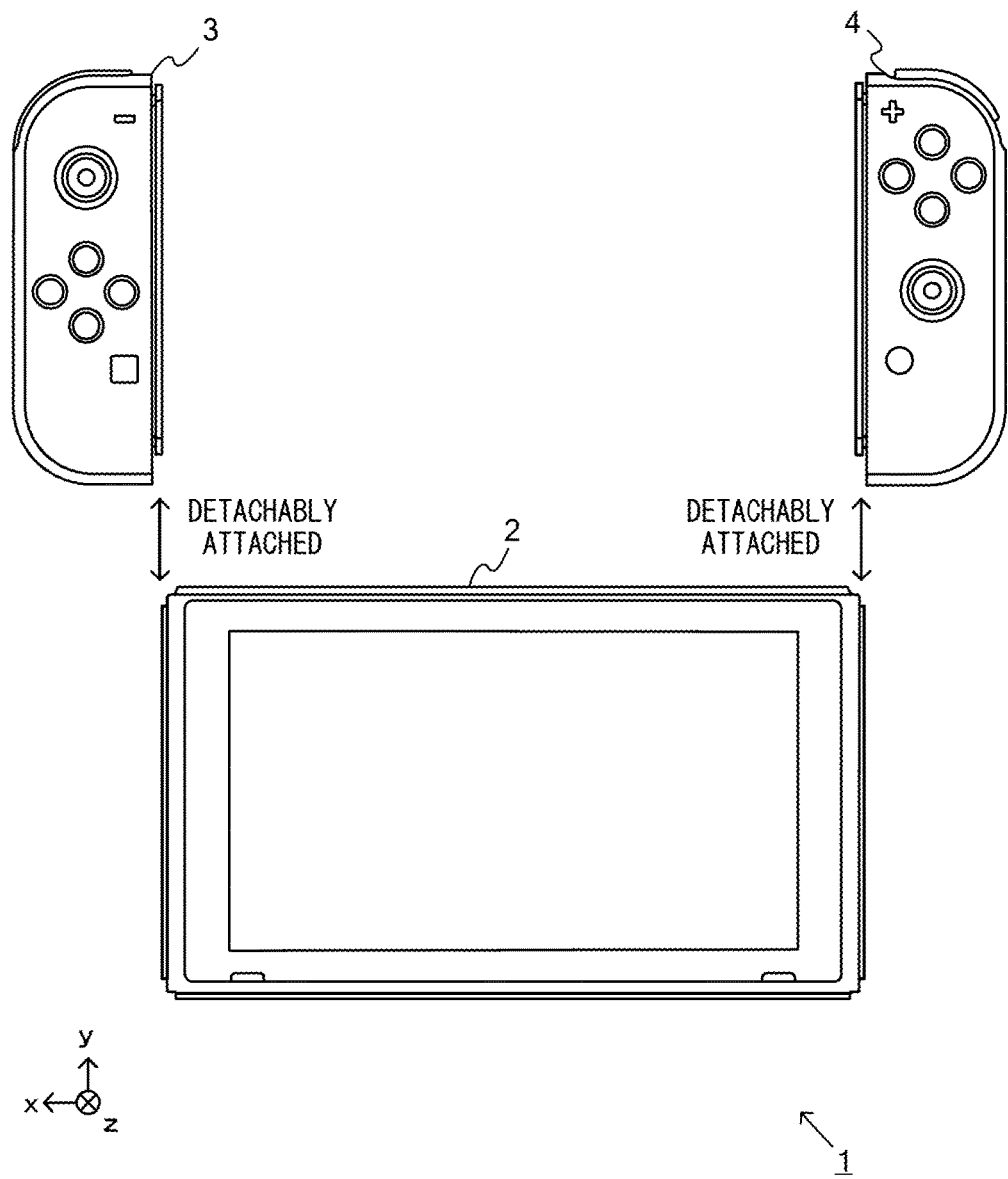
FIG. 2 is an example non-limiting diagram showing an example of a state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
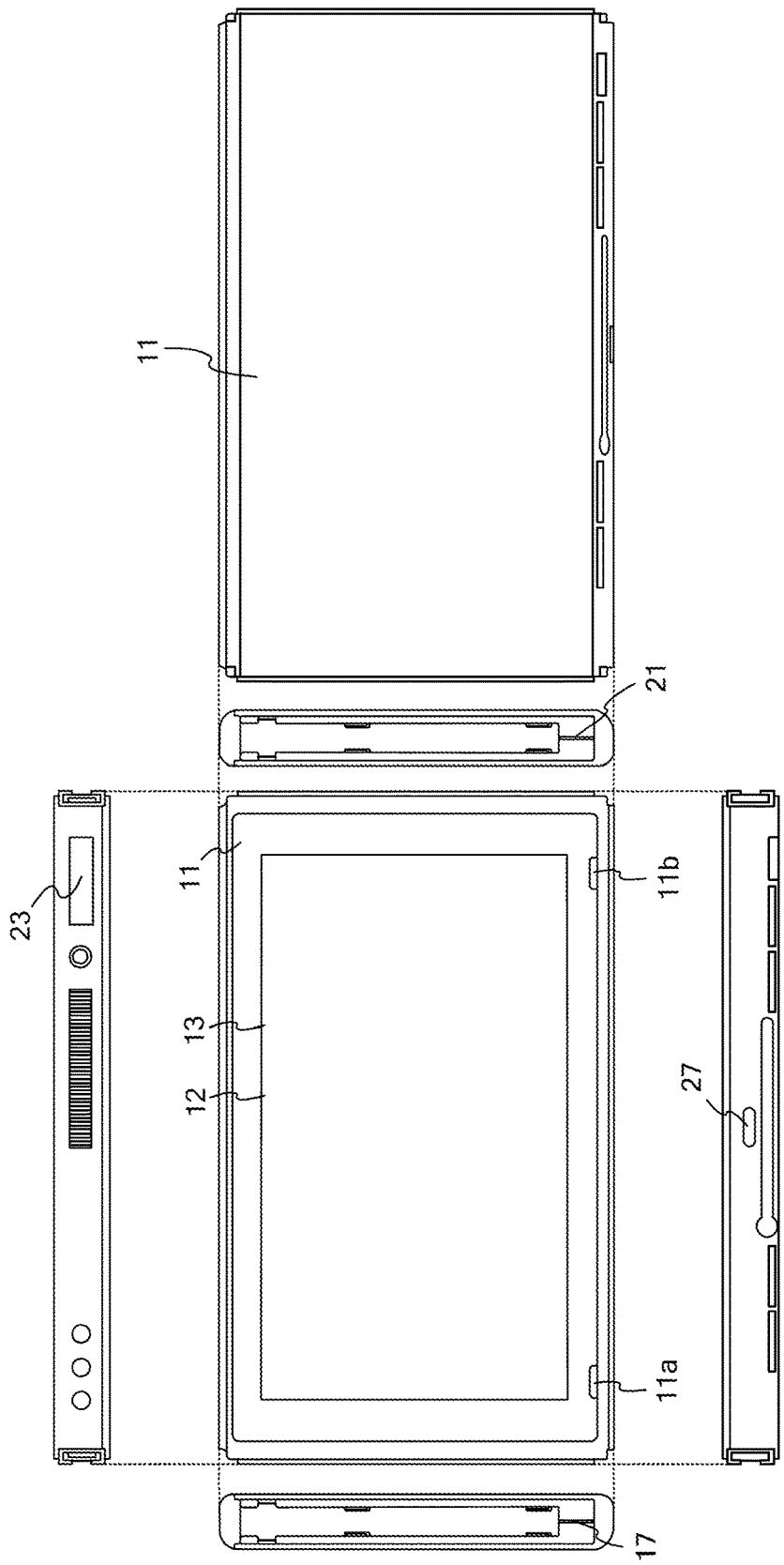
FIG. 3 is example non-limiting six orthogonal views showing an example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a first slot 23. The first slot 23 is provided on an upper side surface of the housing 11. The first slot 23 is so shaped as to allow a first type of storage medium to be attached to the first slot 23. The first type of storage medium is, for example, a dedicated storage medium (e.g., a dedicated memory card) for the game system 1 and an information processing apparatus of the same type as the game system 1. The first type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
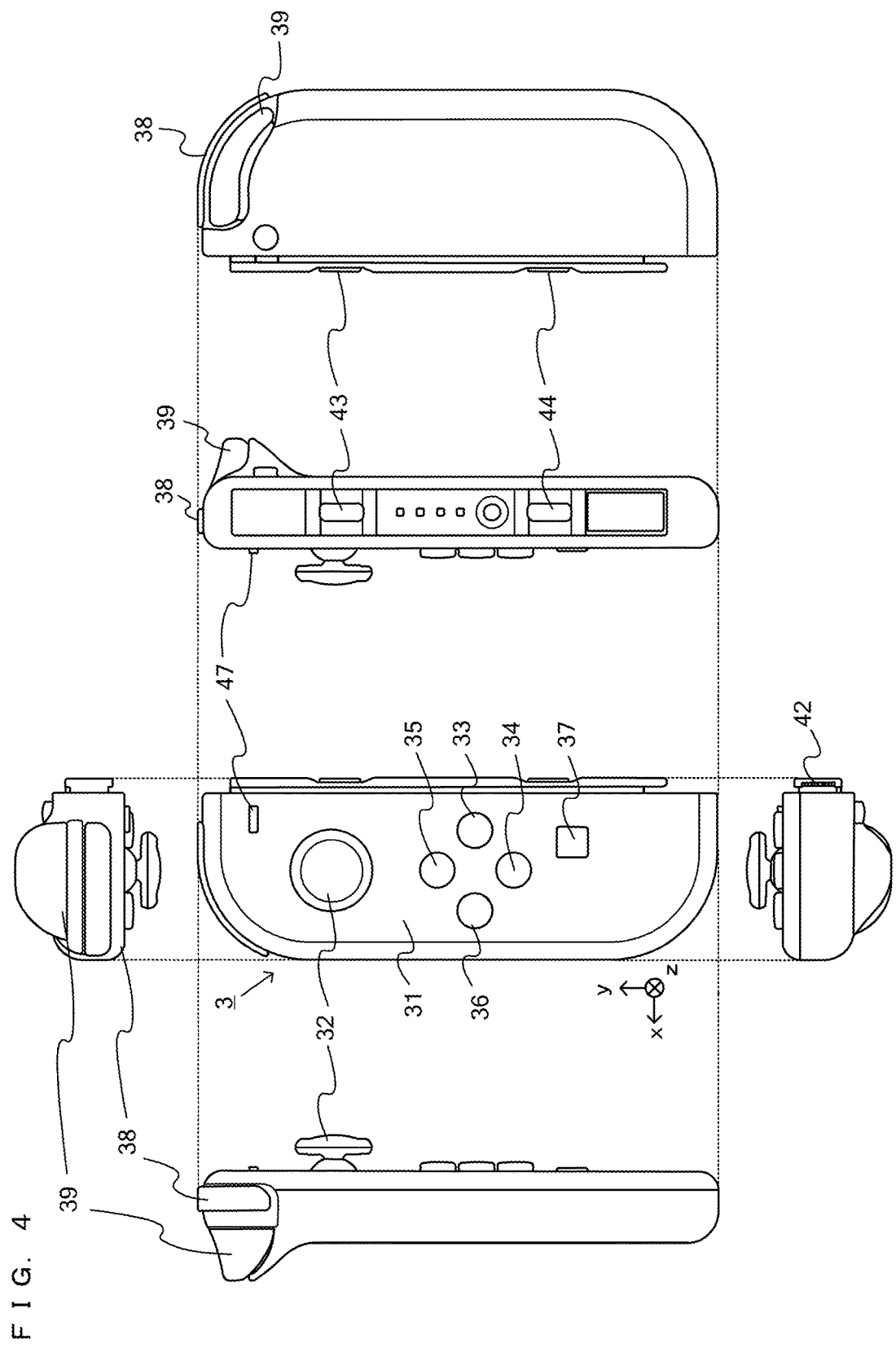
FIG. 4 is example non-limiting six orthogonal views showing an example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIG. 1). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that a cross key, a slide stick that allows a slide input, or the like may be provided as the direction input section, instead of the analog stick. Further, in the exemplary embodiment, it is possible to provide an input by pressing the analog stick.

The left controller 3 includes various operation buttons. Initially, the left controller 3 includes four operation buttons 33 to 36 (specifically, a right direction button 33, a down direction button 34, an up direction button 35, and a left direction button 36) on the main surface of the housing 31. Further, a record button 37 and a "−" (minus) button 47 are provided. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
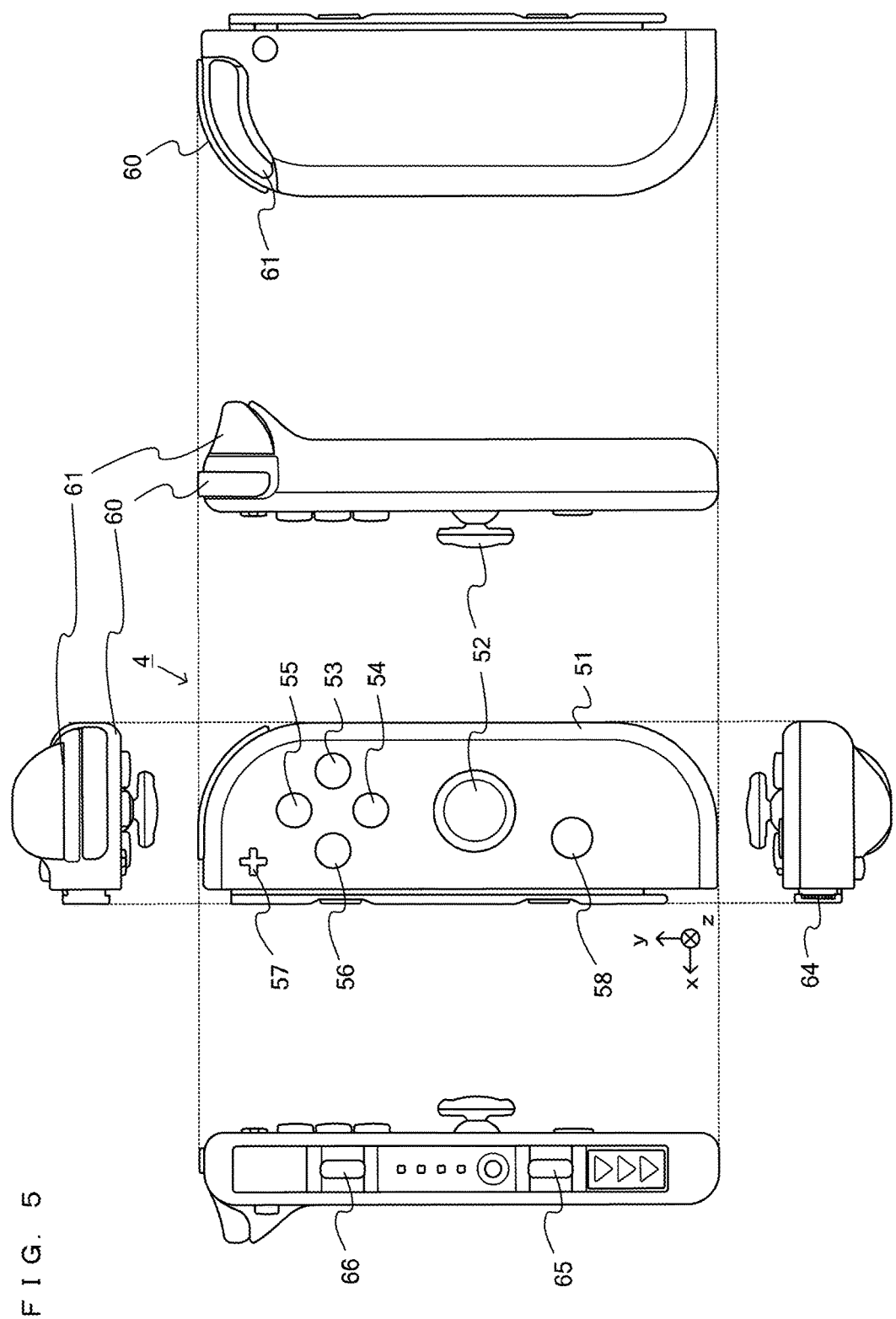
FIG. 5 is example non-limiting six orthogonal views showing an example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, a cross key, a slide stick that allows a slide input, or the like may be provided instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, a "+" (plus) button 57 and a home button 58 are provided. Further, the right controller 4 includes a first R-button 60 and a ZR-button 61 in an upper right portion of a side surface of the housing 51. Further, similarly to the left controller 3, a second L-button 65 and a second R-button 66 are provided.

Further, the right controller 4 includes a terminal 64 for the right controller 4 to perform wired communication with the main body apparatus 2.

FIG. 6 is a block diagram showing an example of the internal configuration of the main body apparatus 2. The main body apparatus 2 includes components 81 to 98 shown in FIG. 6 in addition to the components shown in FIG. 3. Some of the components 81 to 98 may be mounted as electronic components on an electronic circuit board and accommodated in the housing 11.

The main body apparatus 2 includes a CPU (central processing unit) 81. The CPU 81 is an information processing section for executing various types of information processing to be executed by the main body apparatus 2, and, strictly, is a SoC (system-on-a-chip) having a plurality of functions such as a CPU function and a GPU function. The CPU 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the CPU 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the CPU 81. The slot I/F 91 is connected to the first slot 23, and in accordance with an instruction from the CPU 81, reads and writes data from and to the first type of storage medium (e.g., a dedicated memory card) attached to the first slot 23.

The CPU 81 appropriately reads and writes data from and to the flash memory 84, the DRAM 85, and each of the above storage media, thereby performing the above information processing.

The main body apparatus 2 includes a network communication section 82. The network communication section 82 is connected to the CPU 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the CPU 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The CPU 81 is connected to the left terminal 17, the right terminal 21, and the lower terminal 27. When performing wired communication with the left controller 3, the CPU 81 transmits data to the left controller 3 via the left terminal 17 and also receives operation data from the left controller 3 via the left terminal 17. Further, when performing wired communication with the right controller 4, the CPU 81 transmits data to the right controller 4 via the right terminal 21 and also receives operation data from the right controller 4 via the right terminal 21. Further, when communicating with the cradle, the CPU 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a user can provide inputs to the main body apparatus 2 by using the plurality of left controllers 3 and the plurality of right controllers 4.

The main body apparatus 2 includes a touch panel controller 86, which is a circuit for controlling the touch panel 13. The touch panel controller 86 is connected between the touch panel 13 and the CPU 81. Based on a signal from the touch panel 13, the touch panel controller 86 generates, for example, data indicating the position where a touch input is provided. Then, the touch panel controller 86 outputs the data to the CPU 81.

Further, the display 12 is connected to the CPU 81. The CPU 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the CPU 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1).

It should be noted that the angular velocity sensor 90 may detect an angular velocity about one axis or angular velocities about two axes.

The acceleration sensor 89 and the angular velocity sensor 90 are connected to the CPU 81, and the detection results of the acceleration sensor 89 and the angular velocity sensor 90 are output to the CPU 81. Based on the detection results of the acceleration sensor 89 and the angular velocity sensor 90, the CPU 81 can calculate information regarding the motion and/or the orientation of the main body apparatus 2.

The main body apparatus 2 includes a power control section 97 and a battery 98. The power control section 97 is connected to the battery 98 and the CPU 81. Further, although not shown in FIG. 6, the power control section 97 is connected to components of the main body apparatus 2 (specifically, components that receive power supplied from the battery 98, the left terminal 17, and the right terminal 21). Based on a command from the CPU 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
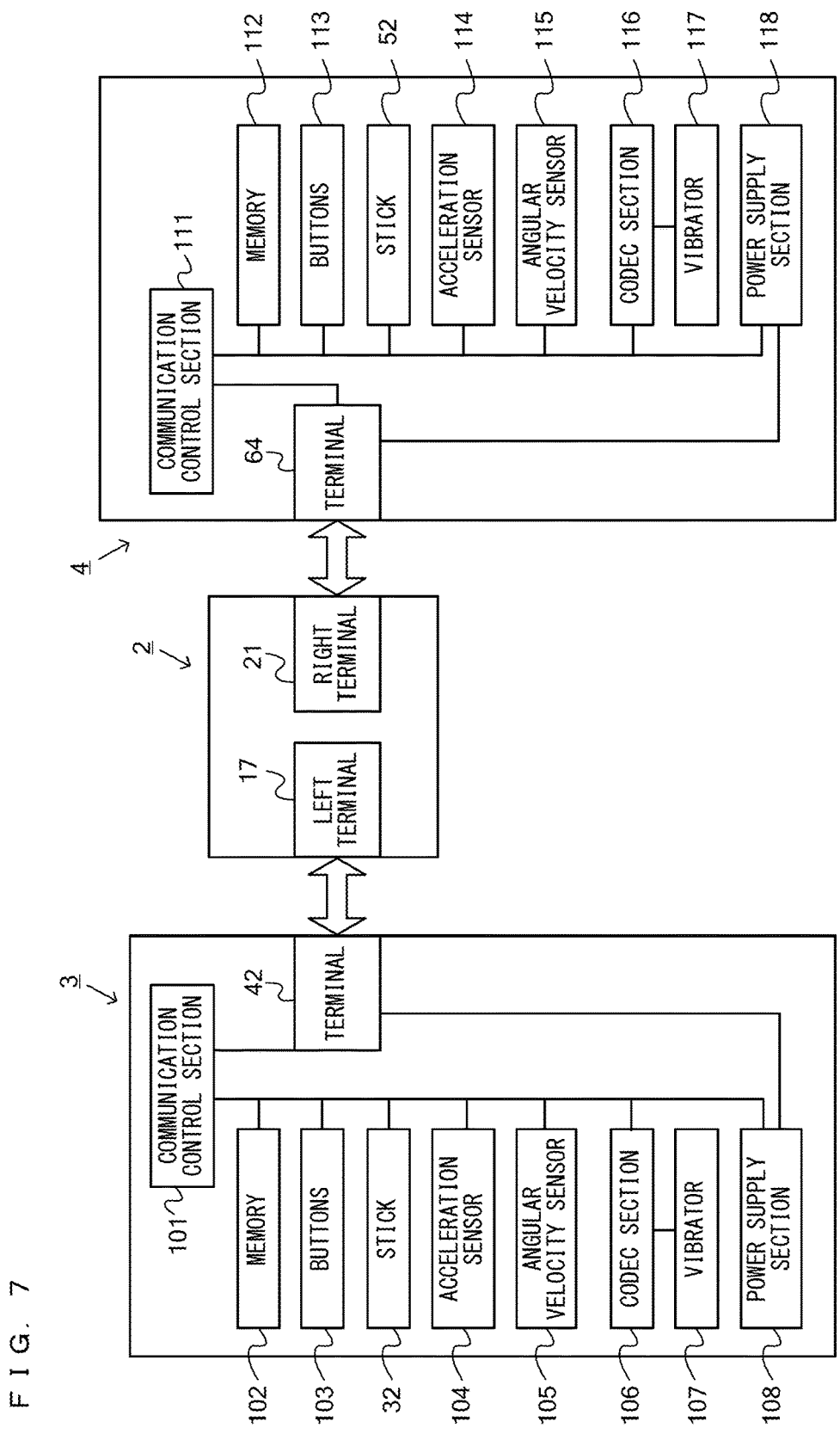
FIG. 7 is an example non-limiting block diagram showing examples of internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, 46, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, an acceleration sensor 104 is provided. Further, an angular velocity sensor 105 is provided. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation, or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, information indicating the waveform itself may be transmitted. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes a power supply section 118. The power supply section 118 has a function similar to that of the power supply section 108 of the left controller 3 and operates similarly to the power supply section 108.

(Outline of Vibration Control in Game of Exemplary Embodiment)

Next, a game performed by using the above-described main body apparatus 2 and the controllers will be described. In the exemplary embodiment, while a game is being performed, the vibrators 107, 117 provided in the left and right controllers 3, 4 vibrate. Hereinafter, a game and vibration control of the vibrator according to the exemplary embodiment will be described.

(First Game)

Figure 8:
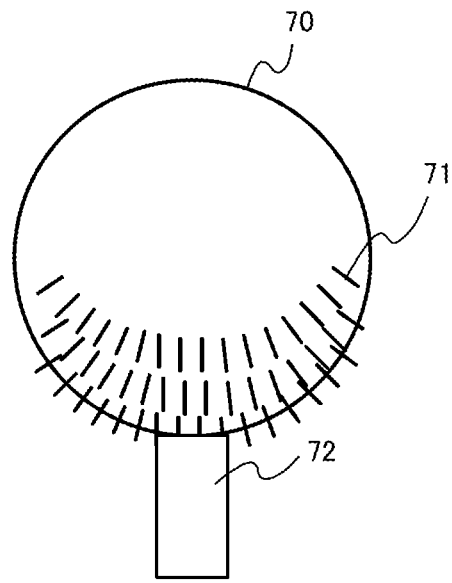
FIG. 8 is an example non-limiting diagram illustrating an outline of a first game.

FIG. 8 is an example non-limiting diagram illustrating an outline of a first game. In the first game, a player uses the controller as a shaver, and virtually shaves a beard. As shown in FIG. 8, in a virtual space, a face object 70 and a shaver object 72 for each controller are disposed. A plurality of beard objects 71 are disposed on the surface of the face object 70. The orientation of the shaver object 72 is in accordance with the orientation of the controller in a real space. When the player changes the orientation of the controller, the orientation of the shaver object 72 is changed, and the end of the shaver object 72 moves along the surface of the face object 70. When the end of the shaver object 72 contacts with the beard object 71, the beard object 71 is shaved. Players shave, by using the controllers 3, 4, respectively, the beard objects 71 disposed on the surfaces of the face objects 70, and a player who shaves the greater number of the beard objects 71 in a predetermined time period wins. In another example, one player may shave the beard objects in the game.

While the first game is being performed, sound is output and the controller vibrates. Audio data for outputting sound used in the first game and vibration pattern data for vibrating the vibrator of the controller are previously stored in the storage device (for example, the flash memory 84 or an external storage medium mounted in the slot 23) of the main body apparatus 2. When a game program is executed, the CPU 81 of the main body apparatus 2 reads the vibration pattern data stored in the storage device and temporarily stores the vibration pattern data in the memory (DRAM 85), reads the vibration pattern data from the memory according to the game process described below, and transmits, to the controller, a signal for vibrating the vibrator.

Figure 9:
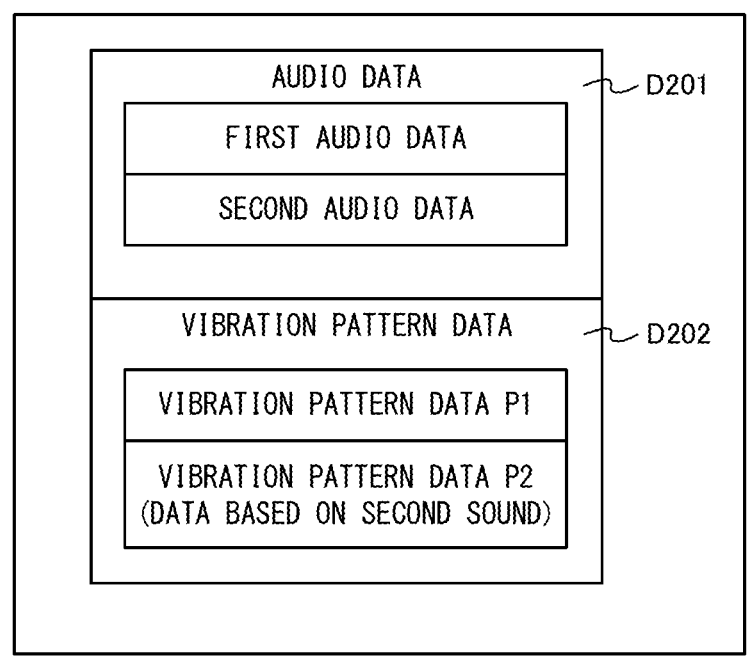
FIG. 9 is an example non-limiting diagram illustrating an example of data, used in the first game, which is previously stored in a storage device of the main body apparatus 2.

FIG. 9 is an example non-limiting diagram illustrating an example of data, used in the first game, which is previously stored in the storage device of the main body apparatus 2.

As shown in FIG. 9, in the main body apparatus 2, audio data D201 for generating a sound signal, and vibration pattern data D202 for vibrating the vibrator of the controller are stored. The audio data D201 includes first audio data and second audio data. The first audio data is for generating a sound signal. When the first audio data is reproduced, a first sound (sound as generated when a motor of the shaver rotates or reciprocates) as generated when an actual shaver operates, is output from speakers 88. The second audio data represents a sound as generated when the beard is shaved, and the second audio data is obtained by, for example, recording a sound generated by a beard being shaved by an actual shaver. When the second audio data is reproduced, a second sound generated when a beard is shaved by an actual shaver is output from the speakers 88.

The vibration pattern data D202 includes vibration pattern data P1 and vibration pattern data P2. The vibration pattern data P1 is for generating a vibration waveform, and for causing the vibrator to perform such a vibration (vibration as generated when the motor of the shaver rotates or reciprocates) as generated when an actual shaver operates. In the exemplary embodiment, the vibrator has a predetermined resonance frequency, and can vibrate at a frequency in a predetermined frequency band including the resonance frequency. The vibrator is structured so as to vibrate at input frequency and amplitude, and, in a case where a predetermined resonance frequency is input, the vibration of the vibrator tends to be maximum. The vibration pattern data P1 is for setting predetermined frequency and amplitude. The vibration pattern data P1 may be vibration pattern data for vibrating the vibrator at the resonance frequency (or a frequency close to the resonance frequency).

Further, the vibration pattern data P2 is for causing the vibrator to perform a vibration as generated when a beard is actually shaved. The vibration pattern data P2 is generated based on the second sound. Specifically, the vibration pattern data P2 is obtained by the following two steps. In a first step, a sound (the second sound) generated by a beard being shaved by an actual shaver is recorded. In a subsequent second step, a waveform of the recorded second sound is converted by using a predetermined converter, to generate a vibration waveform. For example, a specific frequency component (for example, a component having a frequency which is not higher than a first frequency and a component having a frequency which is not lower than a second frequency) of the second sound is cut by using the predetermined converter, to generate a vibration waveform in a predetermined frequency band. In the description herein, a "predetermined frequency band" is a frequency band in which the vibrator can vibrate. Thus, the vibration pattern data P2 is generated based on the second sound generated when a beard is shaved by an actual shaver.

In the description herein, a vibration waveform generated based on such an audio waveform is referred to as "audio vibration waveform". The audio vibration waveform has a waveform that is the same as or similar to the waveform of the original sound.

In the exemplary embodiment, unlike the vibration pattern data P2, the vibration pattern data P1 is not generated based on the audio waveform. However, the vibration pattern data P1 may be also generated based on an audio waveform.

Figure 10:
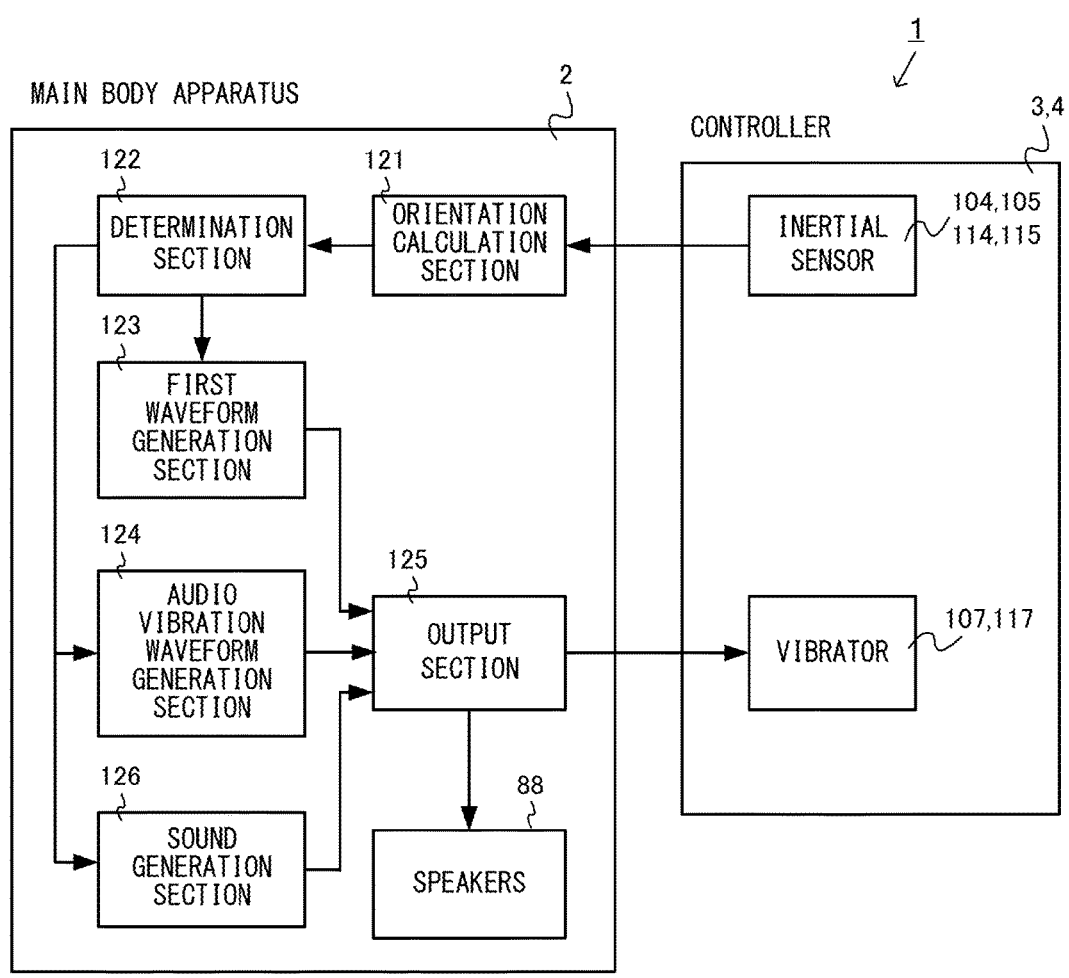
FIG. 10 is an example non-limiting functional block diagram illustrating vibration control in the first game.

FIG. 10 is an example non-limiting functional block diagram illustrating vibration control in the first game.

As shown in FIG. 10, the main body apparatus 2 includes an orientation calculation section 121, a determination section 122, a first waveform generation section 123, an audio vibration waveform generation section 124, an output section 125, and a sound generation section 126. Each of the sections 121 to 126 is implemented by the CPU 81 of the main body apparatus 2 executing a predetermined game program (for example, game program stored in the flash memory 84 or a storage medium mounted in the slot 23). Further, as described above, the left controller 3 includes the inertial sensor (specifically, the acceleration sensor 104 and the angular velocity sensor 105), and the right controller 4 includes the inertial sensor (specifically, the acceleration sensor 114 and the angular velocity sensor 115).

The orientation calculation section 121 calculates orientations of the controllers, based on data from the inertial sensor of the controller (3, 4). Specifically, the orientation calculation section 121 calculates an orientation (tilt) of the left controller 3, based on data from the angular velocity sensor 105 of the left controller 3. Further, the orientation calculation section 121 may calculate an orientation of the left controller 3, based on data from the acceleration sensor 104 of the left controller 3. Similarly, the orientation calculation section 121 calculates an orientation (tilt) of the right controller 4.

The determination section 122 determines whether or not the end of each controller contacts with the beard object 71, based on a position of the end of each controller, and a position of the beard object 71 disposed on the surface of the face object 70. Specifically, the determination section 122 calculates a position of the end of the left controller 3, based on the orientation, of the left controller 3, calculated by the orientation calculation section 121. The determination section 122 determines whether or not the calculated position of the end of the left controller 3 conforms to the position of the beard object 71 disposed on the surface of the face object 70 for the left controller 3, to determine whether or not the end of the left controller 3 contacts with the beard object 71. Similarly, the determination section 122 determines whether or not the end of the right controller 4 contacts with the beard object 71 disposed on the surface of the face object 70 for the right controller 4, based on the orientation, of the right controller 4, calculated by the orientation calculation section 121.

The first waveform generation section 123 generates a signal representing a first vibration waveform, based on the result of determination by the determination section 122. Further, the first waveform generation section 123 generates a signal representing a second vibration waveform. Specifically, the first waveform generation section 123 generates a signal representing the second vibration waveform, based on the vibration pattern data P1. When the signal is input to the vibrator of the controller, the vibrator performs a vibration as generated when an actual shaver operates. The signal representing the second vibration waveform is generated when the end of the controller is not in contact with the beard object 71, and is generated after the first game is started. The signal generated by the first waveform generation section 123 is output to the output section 125.

Further, when the determination section 122 determines that the end of the controller has contacted with the beard object 71, the first waveform generation section 123 generates a signal representing the first vibration waveform, based on the vibration pattern data P1. Specifically, in a case where the determination section 122 determines that the end of the controller has contacted with the beard object 71, the first waveform generation section 123 generates a signal, representing the first vibration waveform, obtained by increasing an amplitude of the second vibration waveform based on the vibration pattern data P1, and changing a frequency of the second vibration waveform based on the vibration pattern data P1. That is, the first vibration waveform is almost the same waveform as the second vibration waveform, and is a waveform obtained by changing the frequency and the amplitude. The first waveform generation section 123 outputs, to the output section 125, a signal representing the generated first vibration waveform.

The audio vibration waveform generation section 124 generates a signal representing the audio vibration waveform based on a waveform of a predetermined sound signal. Specifically, the audio vibration waveform generation section 124 generates a signal representing an audio signal waveform, based on the vibration pattern data P2. As described above, the vibration pattern data P2 represents a vibration waveform that is generated based on the second sound generated at the moment when the beard is actually shaved by using a shaver. When the signal representing the audio vibration waveform is input to the vibrator, the vibrator performs vibration having a waveform that is the same as or similar to a waveform of the second sound generated when the beard is shaved by using an actual shaver. The audio vibration waveform generation section 124 outputs, to the output section 125, a signal representing a generated audio signal waveform.

The output section 125 outputs, to the vibrator of the controller, a signal representing a combined waveform obtained by combining a signal representing the first vibration waveform generated by the first waveform generation section 123, and a signal representing the audio vibration waveform generated by the audio vibration waveform generation section 124. Further, the output section 125 outputs, to the speakers 88, a sound signal generated by the sound generation section 126.

Specifically, when the determination section 122 does not determine that the end of the controller contacts with the beard object 71, the output section 125 outputs, to the vibrator, a signal representing the second vibration waveform generated by the first waveform generation section 123. Further, the output section 125 outputs, to the speakers 88, the first sound signal output from the sound generation section 126.

Meanwhile, when the determination section 122 determines that the end of the controller has contacted with the beard object 71, the audio vibration waveform generation section 124 generates a signal representing the audio vibration waveform. Further, when the determination section 122 determines that the end of the controller has contacted with the beard object 71, the sound generation section 126 generates the second sound signal representing the second sound. Therefore, when the determination section 122 determines that the end of the controller has contacted with the beard object 71, the output section 125 outputs the second sound signal to the speakers 88, and combines the first vibration waveform generated by the first waveform generation section 123 with the audio vibration waveform generated by the audio vibration waveform generation section 124, to output, to the vibrator, a signal representing the combined waveform obtained through the combination. Thus, a signal representing the combined waveform obtained by the first vibration waveform and the audio vibration waveform being combined with each other is output to the vibrator at a time when the second sound is output. Thus, the controller performs a vibration corresponding to the second sound at a time when the second sound is output.

When a signal representing one vibration waveform or a signal representing a combined waveform obtained by a plurality of vibration waveforms being combined with each other is output from the output section 125, the vibrator of the controller vibrates according to the signal. The vibrator of the controller is structured such that, by a frequency and an amplitude being designated, the vibrator vibrates at the designated frequency and amplitude. The output section 125 outputs, to the vibrator, a signal including the frequency and the amplitude of the vibration, at predetermined time intervals (for example, every 5 m seconds). The vibrator of the controller vibrates at the frequency and the amplitude included in the signal. By the signal being output from the output section 125 at the predetermined time intervals, the vibrator performs vibration corresponding to one vibration waveform or vibration corresponding to a combined waveform obtained by a plurality of vibration waveforms being combined with each other.

The sound generation section 126 generates a sound signal based on the audio data. Specifically, when the first game is started, the sound generation section 126 generates, based on the first audio data, the first sound signal as generated when an actual shaver operates. The first sound is generated in both a case where the determination section 122 does not determine that the end of the controller contacts with the beard object 71, and a case where the determination section 122 determines that the end of the controller has contacted with the beard object 71. The first sound signal generated by the sound generation section 126 is output via the output section 125 to the speakers 88. Thus, the first sound is output from the speakers 88.

Further, in a case where the determination section 122 determines that the end of the controller has contacted with the beard object 71, the sound generation section 126 generates the second sound signal based on the second audio data. The second sound signal generated by the sound generation section 126 is output via the output section 125 to the speakers 88. Thus, the second sound as generated at the moment when a beard is shaved by an actual shaver is output from the speakers 88.

The orientation calculation section 121, the determination section 122, the first waveform generation section 123, the audio vibration waveform generation section 124, the output section 125, the sound generation section 126, the inertial sensor, and the vibrator which are shown in FIG. 10 may be disposed in either the main body apparatus 2 or the controller. For example, the first waveform generation section 123, the audio vibration waveform generation section 124, and the output section 125 may be provided in the controller. In this case, the vibration pattern data representing vibration waveforms may be previously stored in the controller. The main body apparatus 2 may output a signal (signal for designating vibration pattern data) representing the vibration waveform, and the controller may read the vibration pattern data corresponding to the received signal, to vibrate the vibrator. Further, all of the orientation calculation section 121, the determination section 122, the first waveform generation section 123, the audio vibration waveform generation section 124, the output section 125, the sound generation section 126, the inertial sensor, and the vibrator may be provided in the main body apparatus 2, or may be provided in the controller.

Next, the motion of the shaver object 72 and vibrations generated before and after the shaver object 72 contacts with the beard object 71 will be described.

Figure 11:
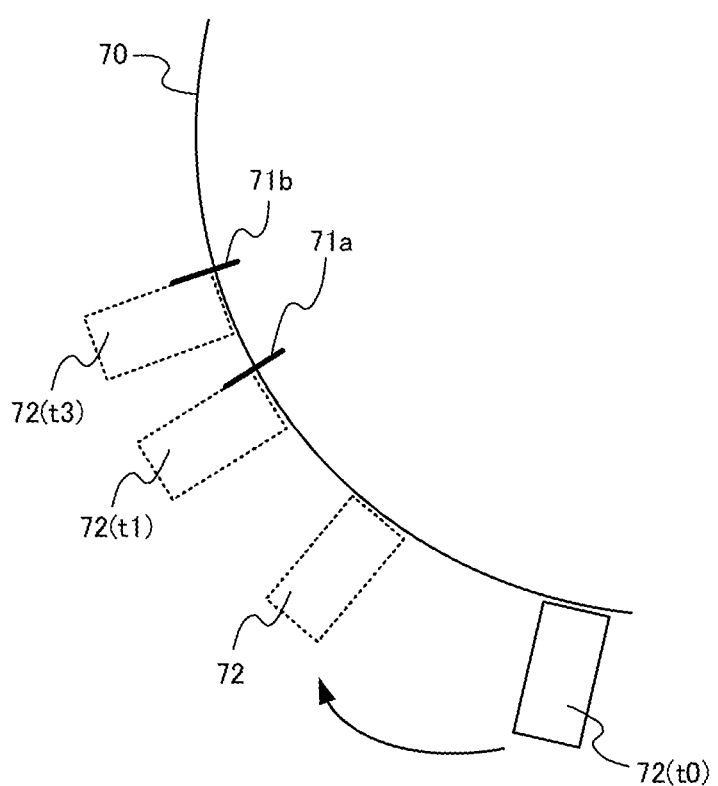
FIG. 11 is an example non-limiting diagram illustrating a state where a shaver object 72 moves and the shaver object 72 contacts with a beard object 71.
Figure 12:
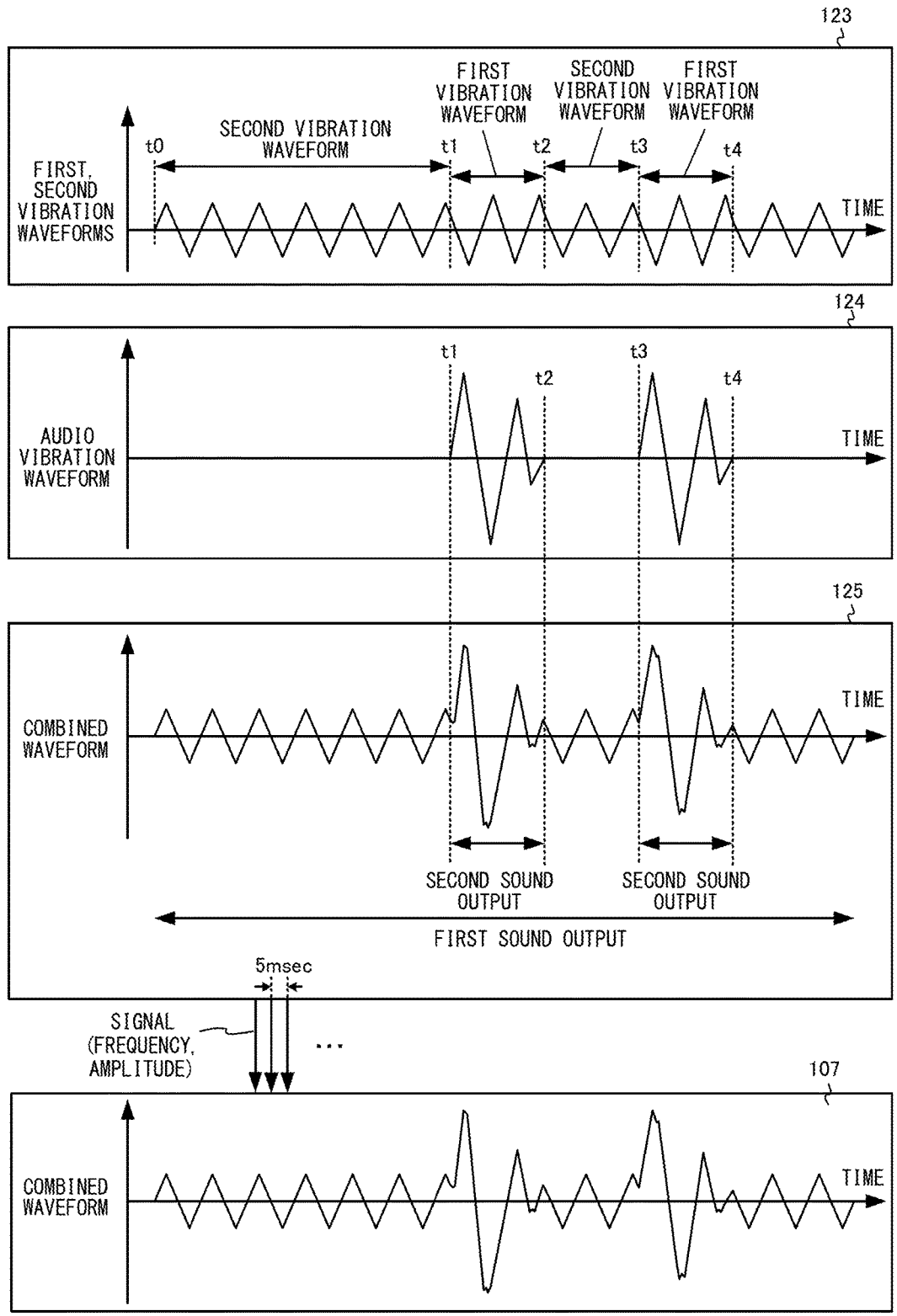
FIG. 12 is an example non-limiting diagram illustrating a vibration waveform prior to the shaver object 72 contacting with the beard object 71, and a vibration waveform in the case of the shaver object 72 contacting with the beard object 71.

FIG. 11 is an example non-limiting diagram illustrating a state where the shaver object 72 moves and the shaver object 72 contacts with the beard object 71. FIG. 12 is an example non-limiting diagram illustrating a vibration waveform prior to the shaver object 72 contacting with the beard object 71, and a vibration waveform in the case of the shaver object 72 contacting with the beard object 71. Although a case where the first game is performed by using the left controller 3 will be described below, the same applies to a case where the right controller 4 is used.

As shown in FIG. 11, at a time t0 when the first game is started, the end of the shaver object 72 is at a predetermined portion on the surface of the face object 70. When the orientation of the left controller 3 is changed by a player, the orientation of the shaver object 72 is changed according to the orientation of the left controller 3, and the end of the shaver object 72 is moved along the surface of the face object 70. At a time t1, the end of the shaver object 72 contacts with a beard object 71a disposed on the surface of the face object 70.

As shown in FIG. 12, from the time t0 when the game is started, to the time t1 when the shaver object 72 contacts with the beard object 71a, the first waveform generation section 123 generates a signal representing the second vibration waveform, based on the vibration pattern data P1.

The signal representing the second vibration waveform is output to the output section 125. In a period from the time t0 to the time t1, the audio vibration waveform is not generated by the audio vibration waveform generation section 124. The output section 125 outputs, to the left controller 3, a signal, representing the second vibration waveform, from the first waveform generation section 123, and the vibrator 107 of the left controller 3 vibrates according to the signal. The output section 125 outputs, to the controller, a signal (frequency and amplitude) representing a vibration waveform, for example, every 5 m seconds. The vibrator 107 vibrates at the frequency and the amplitude based on the signal from the output section 125. Thus, the vibrator 107 vibrates so as to correspond to the vibration waveform output from the output section 125.

Further, in the period from the time t0 to the time t1, the output section 125 outputs, to the speakers 88, the first sound signal generated based on the first audio data. Thus, the first sound as generated when an actual shaver operates is output from the speakers 88.

As shown in FIG. 12, at the time t1 when the shaver object 72 contacts with the beard object 71a, the audio vibration waveform generation section 124 generates a signal representing the audio vibration waveform based on the vibration pattern data P2. The signal representing the audio vibration waveform based on the vibration pattern data P2 is generated in, for example, a period from the time t1 to a time t2.

Further, at the time t1 when the shaver object 72 contacts with the beard object 71a, the first waveform generation section 123 generates a signal representing the first vibration waveform, based on the vibration pattern data P1. The first vibration waveform is almost the same waveform as the second vibration waveform, and is a waveform obtained by a frequency and an amplitude of the second vibration waveform being changed. The signal representing the first vibration waveform is generated in, for example, the period from the time t1 to the time t2.

As shown in FIG. 12, the audio vibration waveform is a waveform different from the first vibration waveform, and is a waveform having an amplitude greater than the first vibration waveform (and the second vibration waveform).

A period in which a signal representing the first vibration waveform is generated may be shorter than or longer than a period in which a signal representing the audio vibration waveform is generated. Further, the first vibration waveform may be exactly equal to the second vibration waveform (frequency and amplitude are equal to those of the second vibration waveform). Further, the first vibration waveform may be a waveform that is completely different from the second vibration waveform. That is, the first vibration waveform may be a waveform generated based on vibration pattern data different from the vibration pattern data P1. Further, the first vibration waveform may be a waveform obtained by either a frequency or an amplitude of the second vibration waveform being changed.

In the period from the time t1 to the time t2, the output section 125 combines the first vibration waveform generated by the first waveform generation section 123 with the audio vibration waveform generated by the audio vibration waveform generation section 124, and generates a signal representing the combined waveform. The output section 125 outputs, to the vibrator 107 of the left controller 3, the signal representing the combined waveform. Thus, in the period from the time t1 to the time t2, vibration based on the combined waveform obtained by the first vibration waveform and the audio vibration waveform being combined with each other, is performed.

Further, the sound generation section 126 generates the second sound signal based on the second audio data in the period from the time t1 to the time t2. The output section 125 outputs the generated second sound signal to the speakers 88. Thus, at the time t1, the second sound generated when a beard is shaved by an actual shaver is output from the speakers 88. Also in the period from the time t1 to the time t2, similarly in the period from the time t0 to the time t1, the first sound as generated when an actual shaver operates is continuously output based on the first audio data. In the period from the time t1 to the time t2, a sound obtained by changing the first sound output in the period from the time t0 to the time t1, may be output.

As shown in FIG. 11, after contact of the shaver object 72 with the beard object 71a, the shaver object 72 is further moved, and, at a time t3, the shaver object 72 contacts with a beard object 71b.

As shown in FIG. 12, in a period from the time t2 to the time t3, the first waveform generation section 123 generates a signal representing the second vibration waveform, based on the vibration pattern data P1. Further, also in the period from the time t2 to the time t3, the first sound is continuously output.

At the time t3 when the shaver object 72 contacts with the beard object 71b, the audio vibration waveform generation section 124 generates a signal representing the audio vibration waveform, based on the vibration pattern data P2, as described above. The signal representing the audio vibration waveform based on the vibration pattern data P2 is generated in, for example, a period from the time t3 to a time t4.

Further, at the time t3 when the shaver object 72 contacts with the beard object 71b, the first waveform generation section 123 generates a signal representing the first vibration waveform, based on the vibration pattern data P1. The signal representing the first vibration waveform is also generated in the period from the time t3 to the time t4.

In the period from the time t3 to the time t4, the output section 125 combines the first vibration waveform generated by the first waveform generation section 123 with the audio vibration waveform generated by the audio vibration waveform generation section 124, as described above, and outputs the signal representing the combined waveform.

Further, at the time t3, the second sound which is generated when a beard is shaved by an actual shaver is output from the speakers 88 as described above. Also in the period from the time t3 to the time t4, the first sound as generated when an actual shaver operates, is continuously output based on the first audio data.

As is apparent from FIG. 12, vibration of the vibrator is relatively small in the period from the time t0 to the time t1, and the vibration is great at the time t1 when the shaver object 72 contacts with the beard object 71a. Further, at the time t1 when the shaver object 72 contacts with the beard object 71a, output of the second sound is started. Further, the vibration of the vibrator is relatively small in the period from the time t2 to the time t3, and the vibration is great at the time t3 when the shaver object 72 contacts with the beard object 71b. At the time t3, the second sound is output.

Thus, a player recognizes, by sound, that the shaver object 72 has contacted with the beard object 71, and can perceives, by vibration, the contact of the shaver object 72 with the beard objects 71. Specifically, when the shaver object 72 contacts with the beard object 71, the second sound generated when an actual shaver contacts with a beard is reproduced, and the audio vibration waveform generated based on the second sound is reproduced. Therefore, the player is allowed to feel as if the beard is shaved.

The shaver object 72 may simultaneously contact with a plurality of beard objects 71. Further, after the shaver object 72 contacts with a certain beard object 71, before output of the audio vibration waveform generated by the contact of the shaver object 72 with the beard object 71 is ended, the shaver object 72 may contact with another beard object 71. Thus, in a case where signals representing a plurality of audio vibration waveforms are simultaneously generated by the shaver object 72 contacting with the plurality of the beard objects 71, the output section 125 combines the audio vibration waveforms with each other. Further, the output section 125 outputs the second sound signal to the speakers according to the shaver object 72 contacting with each beard object 71. For example, in a case where the shaver object 72 simultaneously contacts with the two beard objects 71, the audio vibration waveforms are combined with each other and an amplitude of the combined waveform is increased. Thus, a player perceives greater vibration. The upper limit may be set for the number of the vibration waveforms to be combined by the output section 125.

As described above, in the first game, the second vibration waveform is generated based on the vibration pattern data P1, and vibration generated when the shaver operates constantly occurs. In a case where the shaver object 72 contacts with the beard object 71 when vibration by the second vibration waveform occurs, a combined waveform which is obtained by combining the first vibration waveform obtained by the frequency and amplitude of the second vibration waveform being changed, with the audio vibration waveform based on the second sound is generated at a time when the second sound is output.

Thus, the second sound, and the combined waveform obtained by the audio vibration waveform based on the second sound and the first vibration waveform being combined with each other are output at a time when the second sound is output, whereby a player is allowed to perceive the sound and vibration based on the sound, and is allowed to have more realistic experience.

(Second Game)

Next, a second game will be described. In the second game, for example, a state where a bottle containing sparkling wine is swung, and the pressure in the bottle is enhanced, to uncork the bottle, is produced. For example, a plurality of players sequentially swing one controller, and, when a predetermined condition has been satisfied, the controller vibrates as if the bottle is uncorked and the sparkling wine in the bottle is sprayed.

Figure 13:
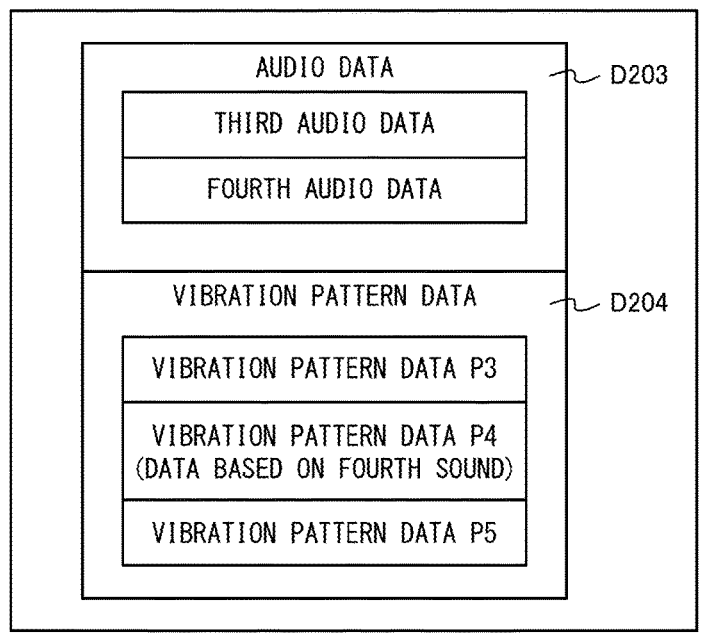
FIG. 13 is an example non-limiting diagram illustrating an example of data, used in a second game, which is previously stored in the storage device of the main body apparatus 2.

FIG. 13 is an example non-limiting diagram illustrating an example of data, used in the second game, which is previously stored in the storage device of the main body apparatus 2.

As shown in FIG. 13, in the main body apparatus 2, audio data D203 for generating a sound signal, and vibration pattern data D204 for vibrating the vibrator of the controller are stored. The audio data D203 includes third audio data and fourth audio data. The third audio data is audio data for generating a sound caused when the bottle is uncorked. When the third audio data is reproduced, a loud sound (third sound) as generated when a pressure in the bottle is enhanced to uncork the bottle is output from the speakers 88. The fourth audio data is audio data for generating a sound caused when the sparkling wine in the bottle is sprayed. When the fourth audio data is reproduced, a fourth sound generated when the bottle is uncorked and the sparkling wine thereinside is sprayed is output from the speakers 88. The fourth sound is represented by the audio data obtained by recording a sound generated when sparkling wine is sprayed.

Further, the vibration pattern data D204 includes vibration pattern data P3, vibration pattern data P4, and vibration pattern data P5.

The vibration pattern data P3 is vibration pattern data for generating a vibration waveform, and is data for causing the vibrator to perform a strong vibration generated when the bottle is uncorked. Specifically, the vibration pattern data P3 is data for vibrating the vibrator at a predetermined resonance frequency (or a frequency close thereto) of the vibrator in order to strongly vibrate the vibrator.

Further, the vibration pattern data P4 is data for causing the vibrator to perform vibration as generated when the sparkling wine is sprayed. Specifically, the vibration pattern data P4 is obtained by recording the fourth sound generated when sparkling wine is sprayed and converting a waveform of the recorded fourth sound by using a predetermined convertor. That is, the vibration pattern data P4 is vibration pattern data generated based on the fourth sound that is generated when the bottle is uncorked and sparkling wine thereinside is sprayed. The vibration pattern data P4 is data for generating an audio vibration waveform.

Further, the vibration pattern data P5 is vibration pattern data for generating a vibration waveform, and is data different from the vibration pattern data P3 and the vibration pattern data P4.

Figure 14:
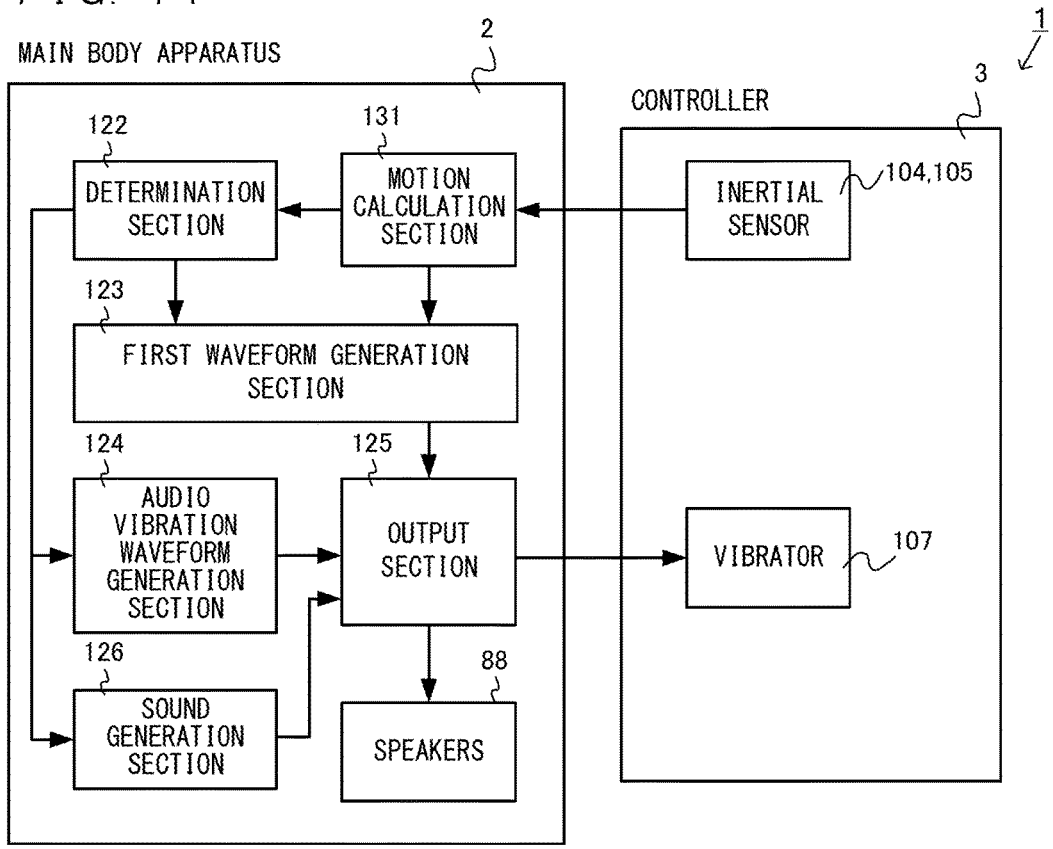
FIG. 14 is an example non-limiting functional block diagram illustrating vibration control in the second game.

FIG. 14 is an example non-limiting functional block diagram illustrating vibration control in the second game. In the following description, the second game is performed by using the left controller 3.

As shown in FIG. 14, the main body apparatus 2 includes a motion calculation section 131, a determination section 122, a first waveform generation section 123, an audio vibration waveform generation section 124, an output section 125, and a sound generation section 126. The configuration for the second game shown in FIG. 14 and the configuration for the first game shown in FIG. 10 are basically the same. Difference from the configuration for the first game will be mainly described below.

The motion calculation section 131 calculates a motion of the controller based on data from the inertial sensor of the left controller 3. Specifically, the motion calculation section 131 determines whether or not the controller is being swung, and calculates the vigorousness of the swinging when the controller is being swung, based on the data from the acceleration sensor 104 of the controller. For example, the motion calculation section 131 calculates a value of an acceleration (value of acceleration other than gravitational force) detected by the controller being swung, based on the data from the acceleration sensor 104. The motion calculation section 131 outputs the calculated value of the acceleration to the determination section 122 and the first waveform generation section 123.

The determination section 122 determines whether or not a predetermined condition has been satisfied, based on the motion, of the controller, calculated by the motion calculation section 131. For example, the determination section 122 calculates a cumulative value of the values of the accelerations output from the motion calculation section 131, and determines whether or not the cumulative value exceeds a predetermined threshold value.

In a case where the determination section 122 determines that the predetermined condition is not satisfied, the first waveform generation section 123 generates a signal representing a second vibration waveform, based on the value of the acceleration output by the motion calculation section 131. Further, in a case where the determination section 122 determines that the predetermined condition has been satisfied, the first waveform generation section 123 generates a signal representing a first vibration waveform.

Specifically, in a case where the determination section 122 determines that the predetermined condition is not satisfied, the first waveform generation section 123 generates a signal representing the second vibration waveform based on the vibration pattern data P5. Meanwhile, in a case where the determination section 122 determines that the predetermined condition has been satisfied, the first waveform generation section 123 generates a signal representing the first vibration waveform, based on the vibration pattern data P3. The first vibration waveform is a waveform different from the second vibration waveform, and has an amplitude greater than the second vibration waveform. As described above, the vibration pattern data P3 is vibration pattern data for causing the vibrator to perform a strong vibration as generated when a bottle is uncorked.

Further, the audio vibration waveform generation section 124 generates a signal representing an audio signal waveform, based on the vibration pattern data P4. As described above, the vibration pattern data P4 is data for causing the vibrator to perform a vibration as generated when sparkling wine is sprayed. When the signal representing the audio signal waveform is input to the vibrator, the vibrator performs a vibration that has a waveform equal to or similar to the waveform of the fourth sound generated when sparkling wine is sprayed.

In a case where the determination section 122 determines that the predetermined condition is not satisfied, the output section 125 outputs, to the vibrator of the controller, a signal representing the second vibration waveform based on the vibration pattern data P5. Meanwhile, in a case where the determination section 122 determines that the predetermined condition has been satisfied, the output section 125 outputs, to the vibrator of the controller, a signal representing a combined waveform obtained by a signal representing the first vibration waveform generated by the first waveform generation section 123 and a signal representing the audio vibration waveform generated by the audio vibration waveform generation section 124 being combined with each other. Further, in a case where the determination section 122 determines that the predetermined condition has been satisfied, the output section 125 outputs, to the speakers 88, the third sound signal and the fourth sound signal generated by the sound generation section 126.

In a case where the determination section 122 determines that the predetermined condition has been satisfied, the sound generation section 126 generates the third sound signal based on the third audio data, and generates the fourth sound signal based on the fourth audio data. Thus, in a case where the determination section 122 determines that the predetermined condition has been satisfied, the loud third sound generated when a bottle is uncorked, is output from the speakers 88, and the fourth sound generated when sparkling wine is sprayed is output from the speakers.

Figure 15:
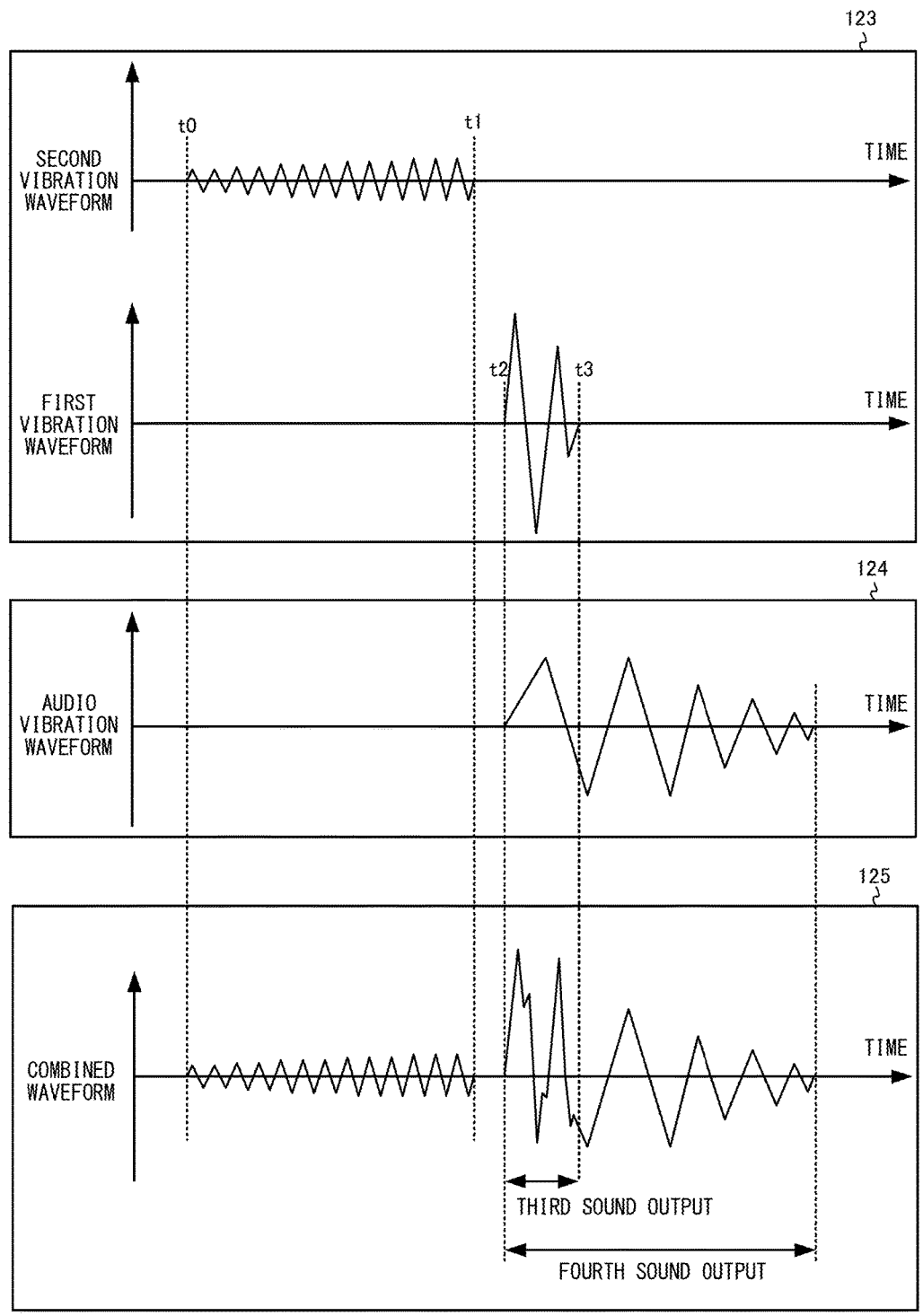
FIG. 15 is an example non-limiting diagram illustrating vibration waveforms obtained before and after a predetermined condition is satisfied.

Next, a vibration waveform in the case of the second game being performed will be described. FIG. 15 is an example non-limiting diagram illustrating vibration waveforms obtained before and after a predetermined condition is satisfied.

As shown in FIG. 15, the first waveform generation section 123 generates a signal representing the second vibration waveform, based on the vibration pattern data P5, from a time t0 when swinging of the controller is started. This signal is output to the output section 125, and output from the output section 125 to the controller. In a case where the controller is continuously swung, the determination section 122 calculates a cumulative value of the values of the accelerations detected by the acceleration sensor 104. An amplitude of the second vibration waveform is gradually increased according to the cumulative value of the accelerations. By the amplitude of the second vibration waveform being gradually increased, a player is caused to feel as if a pressure in the bottle is gradually enhanced. In a case where the player swings the controller, and then halts swinging the controller, the cumulative value of the accelerations is not increased, and, thus, the amplitude of the second vibration waveform represents a constant value. In a case where the player restarts swinging the controller, the cumulative value of the accelerations is increased, and the amplitude of the second vibration waveform is also increased again.

In a period from the time t0 to a time t1, the output section 125 outputs, to the vibrator of the controller, the signal generated by the first waveform generation section 123, at predetermined time intervals (for example, every 5 m seconds). Thus, the vibrator vibrates so as to correspond to the second vibration waveform.

At the time t1, in a case where the determination section 122 determines that the predetermined condition has been satisfied (in a case where the cumulative value of the accelerations exceeds a predetermined threshold value), the first waveform generation section 123 ends generation of the second vibration waveform based on the vibration pattern data P5.

At a time t2 when a predetermined time has elapsed since the time t1, the first waveform generation section 123 generates a signal representing the first vibration waveform, based on the vibration pattern data P3. As shown in FIG. 15, the amplitude of the first vibration waveform based on the vibration pattern data P3 is greater than the amplitude of the second vibration waveform based on the vibration pattern data P5. The first waveform generation section 123 generates the signal representing the first vibration waveform, in a period from the time t2 to a time t3.

Further, at the time t2, the audio vibration waveform generation section 124 generates a signal representing the audio vibration waveform, based on the vibration pattern data P4.

Further, at the time t2, by the sound generation section 126, the third sound signal is generated and the fourth sound signal is generated.

In the period from the time t2 to the time t3, the output section 125 combines the first vibration waveform and the audio vibration waveform with each other, and generates a signal representing the combined waveform. The output section 125 outputs, to the vibrator of the controller, a signal representing the combined waveform, at predetermined time intervals (for example, every 5 m seconds). Thus, the vibrator vibrates so as to correspond to the combined waveform. By the two vibration waveforms being combined with each other, the vibrator more strongly vibrates.

Also at and after the time t3, the signal representing the audio vibration waveform is continuously generated by the audio vibration waveform generation section 124, and the signal is output to the controller by the output section 125. The amplitude of the audio vibration waveform is gradually reduced with the elapse of time.

Further, at the time t2, the output section 125 outputs, to the speakers 88, the third sound signal generated by the sound generation section 126, and outputs the fourth sound signal to the speakers 88. Thus, in a case where the determination section 122 determines that the predetermined condition has been satisfied, the loud third sound as generated when a bottle is uncorked, is output, and the fourth sound generated when sparkling wine is sprayed from the bottle, is output.

Thus, in the second game, a player swings the controller and, when a cumulative value of accelerations detected according to the swinging exceeds a predetermined threshold value (time t1), the vibration that has been generated is temporarily halted (the amplitude of the vibration is reduced), and a strong vibration is caused at the time t2 when a predetermined time has elapsed, and the third sound (loud sound caused when the bottle is uncorked) is generated. Simultaneously, the fourth sound (sound caused when sparkling wine is sprayed) is generated, and audio vibration (vibration waveform generated based on the waveform of the fourth sound) based on the fourth sound is generated. The two vibration waveforms generated at the time t2 are combined with each other, and the combined vibration waveform is output to the vibrator.

At a time when the fourth sound is output, a combined waveform obtained by the first vibration waveform and the audio vibration waveform based on the fourth sound being combined with each other, is output, whereby a player is allowed to perceive sound and vibration corresponding to the sound, and to perform more realistic experience.

Further, the vibration, based on the first vibration waveform, which is generated at the time t2 is a vibration for which a resonance frequency at which the vibrator more easily vibrates is designated. The vibrator is structured to vibrate at the designated frequency and amplitude, and the vibration at the resonance frequency tends to be maximized (strongest). At the time t2, by the vibrator being vibrated at the resonance frequency of the vibrator, the vibrator can be more strongly vibrated, which can surprise a player.

The first vibration waveform may also be a vibration waveform generated based on the waveform of sound generated when the bottle is uncorked, similarly to the audio vibration waveform based on the fourth sound. That is, a loud sound generated when a bottle is actually uncorked, may be recorded, and an audio vibration waveform may be generated based on the waveform of the recorded sound, and may be stored as vibration pattern data, and the first vibration waveform may be generated based on the vibration pattern data. However, the audio vibration waveform generated based on sound may not allow the vibrator to more strongly (greatly) vibrate. This is because the vibrator has a resonance frequency, and tends to most strongly vibrate at the resonance frequency, and, when the frequency of the audio vibration waveform generated based on the sound does not coincide with the resonance frequency of the vibrator, the vibrator is difficult to strongly vibrate even when the amplitude is designated to the maximum degree.

However, in the second game, the resonance frequency is designated to vibrate the vibrator, whereby the vibrator can be more strongly vibrated.

Further, in the second game, before a predetermined condition is satisfied, vibration based on the second vibration waveform is performed, and the vibration based on the second vibration waveform is halted at the time t1 when the predetermined condition is satisfied, and a strong vibration based on the first vibration waveform is performed at the time t2 when a predetermined time has elapsed. Vibration is momentarily halted before a strong vibration based on the first vibration waveform is generated, whereby a player is allowed to easily perceive the strong vibration.

An amplitude may be reduced without completely halting the vibration before a strong vibration based on the first vibration waveform is generated.

(Detail of Vibration Control)

Next, a process performed by the main body apparatus 2 for performing the above-described vibration control will be described in detail. Firstly, data output from the controller and data input to the controller will be described.

Figure 16:
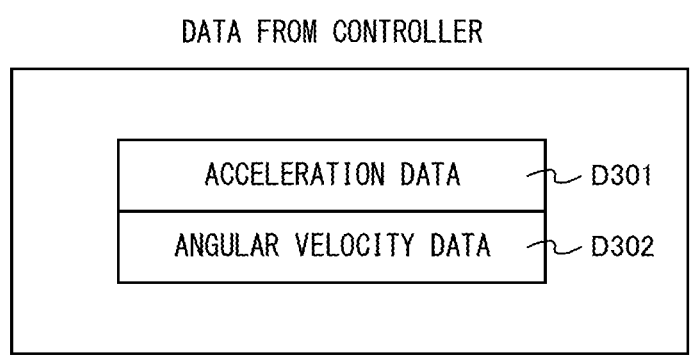
FIG. 16 is an example non-limiting diagram illustrating an example of data output from the controller.
Figure 17:
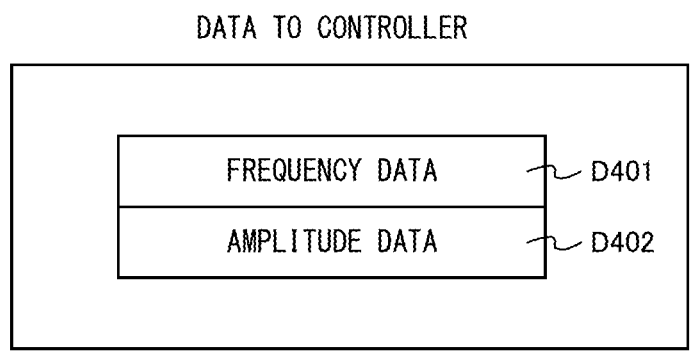
FIG. 17 is an example non-limiting diagram illustrating an example of data input to the controller.

FIG. 16 is an example non-limiting diagram illustrating an example of data output from the controller. FIG. 17 is an example non-limiting diagram illustrating an example of data input to the controller. While the above-described game is being performed, the data shown in FIG. 16 is output from the left controller 3 and/or the right controller 4 to the main body apparatus 2 at predetermined time intervals (for example, every 5 m seconds). Further, while the above-described game is being performed, the data shown in FIG. 17 is input from the main body apparatus 2 to the left controller 3 and/or the right controller 4 at predetermined time intervals (for example, every 5 m seconds).

As shown in FIG. 16, the data output from the controller includes acceleration data D301 and angular velocity data D302. The acceleration data D301 represents an acceleration, in each axis direction, detected by the acceleration sensor (104, 114) of the controller. Further, the angular velocity data D302 represents an angular velocity, around each axis, detected by the angular velocity sensor (105, 115) of the controller.

Further, as shown in FIG. 17, the data input to the controller includes frequency data D401 and amplitude data D402. The frequency data D401 is for designating a frequency for vibrating the vibrator (107, 117) of the controller. The amplitude data D402 is for designating an amplitude for vibrating the vibrator of the controller.

(Detail of Process of Main Body Apparatus)

Figure 18:
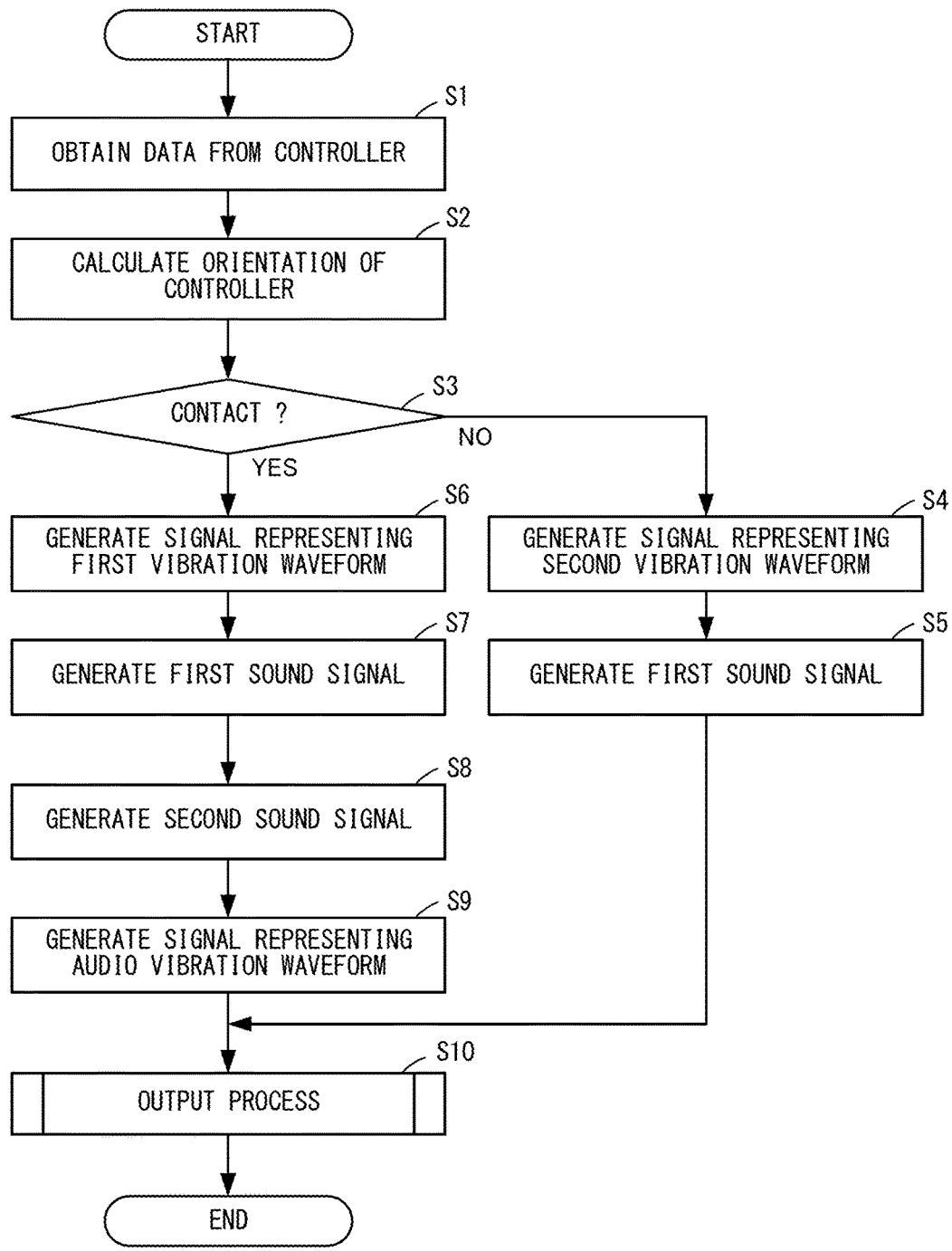
FIG. 18 is an example non-limiting flow chart showing in detail a process performed by the main body apparatus 2 when the first game is performed.

Next, a process performed by the main body apparatus 2 will be described in detail. FIG. 18 is an example non-limiting flow chart showing in detail a process performed by the main body apparatus 2 when the first game is performed. The process shown in FIG. 18 is performed by the CPU 81 of the main body apparatus 2 executing a predetermined game program stored in the storage device. The main body apparatus 2 performs the process shown in FIG. 18 at predetermined time intervals (for example, every 5 m seconds).

As shown in FIG. 18, the main body apparatus 2 obtains the data shown in FIG. 16 from each controller (step S1). Next, the main body apparatus 2 calculates an orientation of each controller based on the data obtained from each controller in step S1 (step S2). Specifically, the main body apparatus 2 calculates an orientation of each controller based on the acceleration data D301 and/or the angular velocity data D302.

Next, the main body apparatus 2 determines whether or not the shaver object 72 has contacted with the beard object 71, based on the orientation, of each controller, calculated in step S2 (step S3). Specifically, the main body apparatus 2 calculates a position of the end of the shaver object 72 for each controller, based on the orientation, of the controller, calculated in step S2, and determines whether or not the calculated position coincides with the position of the beard object 71.

When it is determined that the shaver object 72 does not contact with the beard object 71 (step S3: NO), the main body apparatus 2 generates a signal representing the second vibration waveform (step S4). Specifically, the main body apparatus 2 performs the process step of step S3 at predetermined time intervals (every 5 m seconds), and sequentially reads the vibration pattern data P1 that is previously stored, according to the elapse of time, and sequentially reproduces the vibration based on the vibration pattern data P1. When the reproduction of the vibration based on the vibration pattern data P1 is ended, the main body apparatus 2 reproduces again the vibration based on the vibration pattern data P1.

More specifically, the main body apparatus 2 generates a signal representing the second vibration waveform, based on the vibration pattern data P1. The signal includes a frequency and an amplitude of the vibration. This signal is output to the controller and input to the vibrator, for example, every 5 m seconds. The vibrator of the controller receives the signal from the main body apparatus 2, and vibrates at the frequency and amplitude designated by the signal. That is, the frequency and amplitude of the vibration of the vibrator are changed every 5 m seconds. Thus, the vibrator of the controller vibrates so as to correspond to the vibration waveform represented by the vibration pattern data.

Subsequent to step S4, the main body apparatus 2 generates the first sound signal based on the first audio data (step S5).

Meanwhile, in a case where it is determined that the shaver object 72 has contacted with the beard object 71 (step S3: YES), the main body apparatus 2 generates a signal representing the first vibration waveform, based on the vibration pattern data P1 (step S6). For example, the main body apparatus 2 multiplies the amplitude of the second vibration waveform based on the vibration pattern data P1, by a predetermined coefficient (greater than 1), whereby the first vibration waveform having an amplitude greater than the second vibration waveform is generated. Further, the main body apparatus 2 changes the frequency of the second vibration waveform based on the vibration pattern data P1. The main body apparatus 2 generates a signal (frequency and amplitude) representing the first vibration waveform.

Subsequent to step S6, the main body apparatus 2 generates the first sound signal based on the first audio data (step S7). The first sound signal generated in step S7 represents the same sound as the first sound generated in step S5. The first sound signal generated in step S7 may be a sound signal that is different from the first sound signal generated in step S5.

Subsequent to step S7, the main body apparatus 2 generates the second sound signal based on the second audio data (step S8). The second audio data is obtained by recording a sound generated when a shaver actually contacts with a beard.

Subsequent to step S8, the main body apparatus 2 generates a signal representing the audio vibration waveform, based on the vibration pattern data P2 (step S9). The audio vibration waveform based on the vibration pattern data P2 is a vibration waveform based on the second sound, and is a vibration waveform generated based on the waveform of the second sound. A signal representing the audio vibration waveform includes a frequency and an amplitude.

In a case where step S5 is performed or in a case where step S9 is performed, the main body apparatus 2 performs an output process (step S10). The output process will be described below in detail.

Figure 19:
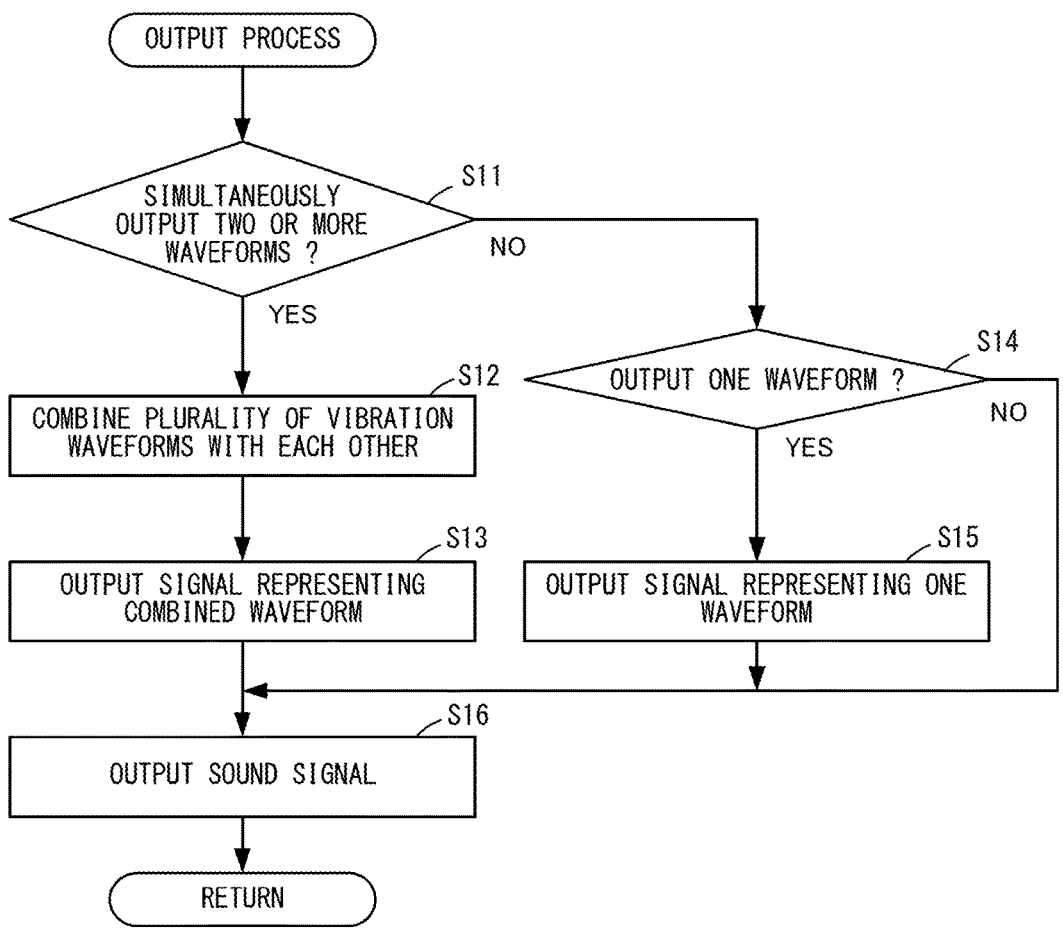
FIG. 19 is an example non-limiting flow chart showing in detail an output process of step S10 shown in FIG. 18.

FIG. 19 is an example non-limiting flow chart showing in detail the output process of step S10 shown in FIG. 18.

The main body apparatus 2 determines whether or not signals representing two or more vibration waveforms are simultaneously output (step S11). In a case where the shaver object 72 has contacted with the beard object 71, two vibration waveforms, that is, the first vibration waveform and the audio vibration waveform are simultaneously generated. Further, in a case where the shaver object 72 has contacted with a plurality of the beard objects 71, two or more vibration waveforms are simultaneously generated.

When it is determined that signals representing two or more vibration waveforms are simultaneously output (step S11: YES), the main body apparatus 2 combines a plurality of vibration waveforms with each other (step S12). Specifically, the main body apparatus 2 performs the calculation indicated below for a signal (frequency and amplitude) representing each vibration waveform generated in the present process loop. Firstly, the main body apparatus 2 calculates the total of the amplitudes of the respective vibration waveforms, as an amplitude Wa of the combined waveform. Next, the main body apparatus 2 calculates the total of the values obtained by multiplying the frequency of each vibration waveform by the amplitude thereof. A value obtained by dividing the total by the amplitude Wa of the combined waveform is calculated as a frequency Wf of the combined waveform.

For example, in a case where the first vibration waveform (frequency=Wf1, amplitude=Wa1) and the audio vibration waveform (frequency=Wf2, amplitude=Wa2) are combined with each other, the main body apparatus 2 performs the following calculation.

Amplitude $Wa$ of combined waveform=$Wa1+Wa2$

Frequency $Wf$ of combined waveform=$(Wf1 \cdot Wa1 + Wf2 \cdot Wa2)/Wa$

Thus, the main body apparatus 2 calculates the total of amplitudes of a plurality of vibration waveforms, as the amplitude Wa of the combined waveform. Further, the main body apparatus 2 calculates a weighted average of frequencies of the plurality of vibration waveforms, thereby calculating the frequency Wf of the combined waveform.

Next, the main body apparatus 2 outputs, to the controller, a signal representing the combined waveform calculated in step S12 (step S13). Specifically, the main body apparatus 2 outputs, to the controller, the frequency data D401 shown in FIG. 17 as the frequency Wf of the combined waveform, and the amplitude data D402 as the amplitude Wa of the combined waveform.

Meanwhile, in a case where it is determined that signals representing two or more vibration waveforms are not simultaneously output (step S11: NO), the main body apparatus 2 determines whether or not a signal representing one vibration waveform is to be output (step S14). In a case where it is determined that a signal representing one vibration waveform is output (step S14: YES), the main body apparatus 2 outputs, to the controller, a signal representing one vibration waveform (step S15). Specifically, the main body apparatus 2 outputs, to the controller, the frequency data D401 as the frequency of the second vibration waveform generated in step S4 and the amplitude data D402 as the amplitude of the vibration waveform generated in step S4.

In a case where the process step of step S13 is performed, in a case where the process step of step S15 is performed, or in a case where the determination of step S14 is NO, the main body apparatus 2 outputs, to the speakers, the sound signal generated in the above process steps (step S16). For example, in a case where it is not determined that the shaver object 72 has contacted with the beard object 71, the main body apparatus 2 outputs the first sound. Further, in a case where it is determined that the shaver object 72 has contacted with the beard object 71, the main body apparatus 2 outputs the first sound and the second sound.

After the process step of step S16, the main body apparatus 2 ends the process shown in FIG. 19.

(Detail of Process of Second Game)

Next, a process performed by the main body apparatus 2 when the second game is performed will be described in detail. FIG. 20 is an example non-limiting flow chart showing in detail a process performed by the main body apparatus 2 when the second game is performed. In FIG. 20, the same process steps as shown in FIG. 18 are denoted by the same step numbers, and the description thereof is not given. The main body apparatus 2 performs the process shown in FIG. 20 at predetermined time intervals (for example, every 5 m seconds).

The main body apparatus 2 calculates a motion of the controller based on the data obtained from the controller in step S1 (step S20). Specifically, the main body apparatus 2 calculates the magnitude of an acceleration vector represented by the values of accelerations, in the three axial directions, output from the controller.

Next, the main body apparatus 2 determines whether or not the motion of the controller has satisfied a predetermined condition (step S21). For example, the main body apparatus 2 stores the cumulative value of accelerations in the memory, and adds, to the cumulative value, the value of the acceleration calculated in the immediately preceding step S20, and updates the cumulative value stored in the memory. The main body apparatus 2 determines whether or not the updated cumulative value is greater than or equal to a predetermined threshold value, thereby determining whether or not the predetermined condition has been satisfied.

In a case where it is determined that the predetermined condition is not satisfied (step S21: NO), the main body apparatus 2 generates a signal representing the second vibration waveform (step S22). Specifically, the main body apparatus 2 generates a signal (frequency and amplitude) representing the second vibration waveform, based on the vibration pattern data P5.

Meanwhile, in a case where it is determined that the predetermined condition has been satisfied (step S21: YES), the main body apparatus 2 halts vibration based on the second vibration waveform (step S23). Thus, at a time when it is determined that the predetermined condition has been satisfied, the vibration based on the second vibration waveform is halted. The main body apparatus 2 starts measuring time (step S24). In a case where the determination of step S21 is YES after the second game is started, the main body apparatus 2 determines YES in step S21 in the following process loops. Further, when the determination of step S21 is YES after the second game is started, the process steps of step S23 and step S24 are each performed once only in the first process loop. That is, the process steps of step S23 and step S24 are not performed even when the determination of step S21 is YES in the following process loops.

Subsequent to step S24, the main body apparatus 2 determines whether or not a predetermined time has elapsed after the measurement is started in step S24 (step S25).

In a case where the determination of step S25 is YES, the main body apparatus 2 generates a signal representing the first vibration waveform, based on the vibration pattern data P3 (step S26). The signal representing the first vibration waveform includes a frequency and an amplitude. The frequency that is set in step S26 is equal to a resonance frequency of the vibrator or close to the resonance frequency thereof. The amplitude that is set in step S26 may be the greatest amplitude that can be designated for the vibrator.

Subsequent to step S26, the main body apparatus 2 generates the third sound signal based on the third audio data (step S27). The third audio data is data representing the loud third sound as generated when a bottle is uncorked.

Subsequent to step S27, the main body apparatus 2 generates the fourth sound signal based on the fourth audio data (step S28). The fourth audio data is data obtained by recording the fourth sound generated when sparkling wine is sprayed from a bottle.

Subsequent to step S28, the main body apparatus 2 generates a signal representing the audio vibration waveform based on the vibration pattern data P4 (step S29). The audio vibration waveform based on the vibration pattern data P4 is a vibration waveform based on the fourth sound and is a vibration waveform generated based on a waveform of the fourth sound. The signal representing the audio vibration waveform includes a frequency and an amplitude.

In a case where step S22 is performed, in a case where step S29 is performed, or in a case where the determination of step S25 is NO, the main body apparatus 2 performs an output process (step S10). The output process is the same process as shown in FIG. 19, and the detailed description is not given.

The above-described process is merely an exemplary process, and, for example, the order in which the process steps are performed may be changed, another step may be added, or a part of the above-described process steps may be omitted.

Further, various modifications, described below, to the above-described exemplary embodiment may be made.

For example, in the above-described exemplary embodiment, the vibration pattern data (vibration pattern data P2 and vibration pattern data P4) representing the audio vibration waveform based on a waveform of a sound signal is previously stored in the storage device of the main body apparatus 2. That is, the vibration pattern data obtained by converting a waveform of a predetermined sound by using a predetermined converter, is previously stored in the storage device. In another exemplary embodiment, when a predetermined sound is output, the vibration pattern data representing an audio vibration waveform based on the sound signal may be generated by converting the predetermined sound with the use of a predetermined converter. That is, the vibration pattern data representing the audio vibration waveform may be generated in real time based on the sound signal when the sound is reproduced.

Further, in the above-described exemplary embodiment, the vibration pattern data representing the audio vibration waveform is generated by converting a predetermined sound by using a predetermined converter. That is, a waveform of a sound is converted by, for example, cutting a specific frequency of the predetermined sound, thereby generating the audio vibration waveform. In another exemplary embodiment, the audio vibration waveform that is exactly equal to a waveform of a sound may be generated without converting the waveform of the sound by using a predetermined converter.

Further, in the second game, in a case where it is determined that the predetermined condition has been satisfied, the first vibration waveform for which a predetermined frequency (specifically, resonance frequency of the vibrator) and a predetermined amplitude are set, is generated. That is, in the second game, the vibrator is vibrated by designating the resonance frequency so as to easily vibrate the vibrator most strongly. Also in the first game, in a case where the shaver object 72 has contacted with the beard object 71, a predetermined frequency (specifically, resonance frequency of the vibrator) and a predetermined amplitude may be set to generate the first vibration waveform.

Further, in the above-described exemplary embodiment, the frequency of a combined wave is obtained in such a manner that the frequencies of the respective waveforms are weighted, and the weighted frequencies are averaged, and the amplitude of the combined wave is obtained by the amplitudes of the respective waveforms being added, to combine the plurality of waveforms with each other. However, a plurality of waveforms may be combined with each other by superposing the plurality of waveforms on each other. That is, a plurality of waveforms may be combined with each other according to the superposition principle of waves In this case, the plurality of waveforms interfere with each other (a wave may is intensified or cancelled by another wave).

Further, in the above-described exemplary embodiment, as a signal representing a vibration waveform, a frequency and an amplitude are output from the main body apparatus 2 to each controller. A signal representing a vibration waveform may be separated into, for example, a signal (frequency and amplitude) in a high frequency band, and a signal (frequency and amplitude) in a low frequency band, and output. For example, the vibrators 107, 117 of the controllers may be each a linear vibration motor (also referred to as linear vibration actuator) that vibrates in a first direction at a first resonance frequency (for example, 320 Hz), and vibrates in a second direction at a second resonance frequency (for example, 160 Hz). Such a vibrator can vibrate at a frequency in a first frequency band (high frequency band) including the first resonance frequency, and can vibrate at a frequency in a second frequency band (low frequency band) including the second resonance frequency. The vibrator tends to strongly vibrate in the first direction at the first resonance frequency, and tends to strongly vibrate in the second direction at the second resonance frequency. Further, the vibrator can vibrate in a direction between the first direction and the second direction by a combined wave obtained by combining vibration in the high frequency band with vibration in the low frequency band, and can vibrate at a frequency in a band from the low frequency band to the high frequency band. In a case where such a vibrator is provided in the controller, the main body apparatus 2 may output, to the controller, a signal in the high frequency band and a signal in the low frequency band. For example, the main body apparatus 2 may transmit, to the controller, one packet including the signal in the high frequency band and the signal in the low frequency band, or may transmit these signals to the controller such that the signals are included in separate packets. The vibrator vibrates based on the received signal in the high frequency band and the received signal in the low frequency band. Further, the controller may include two linear vibration motors (first vibration motor having the first resonance frequency and second vibration motor having the second resonance frequency), and the main body apparatus 2 may output, to the controller, a signal in the high frequency band and a signal in the low frequency band. In this case, the controller vibrates the first vibration motor based on the received signal in the high frequency band, and vibrates the second vibration motor based on the received signal in the low frequency band.

Further, in the above-described exemplary embodiment, a frequency and an amplitude are output from the main body apparatus 2 to each controller, as a signal representing a vibration waveform, at predetermined time intervals (for example, every 5 m seconds). However, in another exemplary embodiment, a difference of the frequency and a difference of an amplitude may be output to the controller at predetermined time intervals. That is, a difference from the frequency output in the immediately preceding process loop may be output to the controller in the present process loop, and a difference from the amplitude output in the immediately preceding process loop may be output to the controller in the present process loop.

Further, in the above-described exemplary embodiment, a frequency and an amplitude are output from the main body apparatus 2 to each controller, as a signal representing a vibration waveform, at predetermined time intervals (for example, every 5 m seconds). However, in another exemplary embodiment, as a signal representing a vibration waveform, the vibration waveform itself may be output to the controller. For example, the vibration pattern data representing the vibration waveform is stored in the main body apparatus 2, and the vibration pattern data itself may be output from the main body apparatus 2 to the controller. Further, in another exemplary embodiment, a plurality of pieces of the vibration pattern data are stored in the controller, and information indicating the vibration pattern data based on which vibration is to be performed may be output, as a signal representing a vibration waveform, from the main body apparatus 2 to the controller. When each controller receives the signal from the main body apparatus 2, the vibration pattern data based on the signal may be selected, to vibrate the vibrator based on the vibration pattern data.

That is, in the exemplary embodiment, the signal representing the vibration waveform may be the frequency and the amplitude as described above, may be a difference in frequency and a difference in amplitude, or may be a vibration waveform itself (that is, the vibration pattern data representing vibration waveform). Further, the signal representing the vibration waveform may be a signal that designates the vibration pattern data (in other words, file in which the vibration patterns are stored).

Further, the above-described game is merely an exemplary one, and another game may be performed. For example, a game in which any other virtual objects as well as the above-described objects are used, may be performed.

Further, in the above-described game, two players or one player play the game. However, three or more players may play the above-described game or another game.

Further, in the above-described exemplary embodiment, the left and the right controllers 3 and 4 are separated from the main body apparatus 2 to play the game. However, in another exemplary embodiment, the above-described game (or another game) may be played in a state where the left and the right controllers 3 and 4 are mounted to the main body apparatus 2.

Further, in the above-described exemplary embodiment, the orientation of the controller is detected based on the data from the inertial sensor. However, the orientation of the controller may be detected in another manner. For example, an image of the controller is taken by using a camera, and the orientation of the controller may be detected based on the taken image.

Further, the determination in step S3 or step S21 in the above-described process is merely an example, and another determination may be made.

Further, the game performed by changing the orientation of the controller or swinging the controller, is described above. In another exemplary embodiment, for example, a predetermined determination may be performed based on an operation on the button or the direction input section of the controller. Further, determination may be performed based on an operation on the touch panel. That is, the above-described determination may be performed based on an operation (operation of tilting or swinging the operation section itself, operation performed on the button, the direction input section, the touch panel, or the like) performed on the operation section.

Further, in the above-described exemplary embodiment, the game process is performed. However, any other information process as well as the game process may be performed.

The above-described hardware configuration is merely an exemplary one. For example, an apparatus having the controller and the main body apparatus 2 integrated with each other may be used.

Although the exemplary embodiment has been described above, the exemplary embodiment is described merely as an example, and various modification and equivalent arrangements may be made.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system, comprising:
a controller;
a vibrator configured to vibrate according to an input signal representing a vibration waveform; and
at least one processor configured to at least:
perform information processing based on input from the controller;
generate a sound signal;
generate a signal representing a first vibration waveform; and
based on the information processing, output the sound signal, and control the vibrator to vibrate in accordance with a signal representing a combined waveform obtained by combining (a) the first vibration waveform, with (b) an audio vibration waveform based on a waveform of the sound signal.

2. The information processing system according to claim 1, wherein the signal representing the combined waveform is output to the vibrator at a time when output of the sound signal is started.

3. The information processing system according to claim 1, wherein the at least one processor is further configured to at least:
determine whether a condition is satisfied in the information processing,
when a determination has been made that the condition has been satisfied in the information processing, generate the first vibration waveform,
generate the sound signal, and
output the sound signal and the signal representing the combined waveform, and
when a determination is made that the condition is not satisfied in the information processing,
generate a second vibration waveform that is equal to the first vibration waveform, and
output a signal representing the second vibration waveform.

4. The information processing system according to claim 3, wherein:

a signal representing the second vibration waveform is output before a determination has been made that the condition is satisfied,
an amplitude of the second vibration waveform is reduced according to the condition being determined to be satisfied, and
the signal representing the combined waveform is output after a certain time has elapsed.

5. The information processing system according to claim 1, wherein the at least one processor is further configured to at least:
determine whether a condition is satisfied in the information processing,
when a determination has been made that the condition has been satisfied in the information processing,
generate the first vibration waveform,
generate the sound signal, and
output the sound signal and the signal representing the combined waveform, and
when a determination has been made that the condition is not satisfied in the information processing,
generate a second vibration waveform that is different from the first vibration waveform, and
output a signal representing the second vibration waveform.

6. The information processing system according to claim 5, wherein the first vibration waveform is a waveform obtained by changing a frequency and/or an amplitude of the second vibration waveform.

7. The information processing system according to claim 1, wherein the controller includes an inertial sensor, and input from the controller includes data obtained from the inertial sensor, and
the at least one processor is further configured to at least:
determine whether a first virtual object contacts with a second virtual object, in the information processing, based on the data obtained from the inertial sensor, and
output the sound signal and output, to the vibrator, the signal representing the combined waveform when a determination is made that the first virtual object has contacted with the second virtual object.

8. The information processing system according to claim 7, wherein:
plural second virtual objects are provided, and
the at least one processor is further configured to at least output a signal representing a combined waveform obtained by the first vibration waveform and a plurality of the audio vibration waveforms being combined with each other, when a determination is made that the first virtual object has contacted with a plurality of the second virtual objects.

9. The information processing system according to claim 1, wherein:
a signal representing the first vibration waveform is generated by setting a frequency and an amplitude, and
the vibrator is configured to vibrate at the set frequency and amplitude.

10. The information processing system according to claim 9, wherein the frequency is set as a resonance frequency of the vibrator.

11. An information processing system, comprising:
a controller;
a vibrator configured to vibrate according to an input signal representing a vibration waveform; and
at least one processor configured to at least:

perform information processing based on input from the controller;

generate a signal representing a first vibration waveform for which a predetermined frequency is set; and output, to the vibrator, a signal representing a combined waveform obtained by combining the first vibration waveform and an audio vibration waveform based on a waveform of a sound, based on the information processing.

12. The information processing system according to claim 11, wherein the predetermined frequency is a resonance frequency of the vibrator.

13. An information processing system comprising:

a controller;

a vibrator configured to vibrate according to an input signal representing a vibration waveform; and at least one processor configured to at least:

determine whether a condition is satisfied, based on input from the controller;

generate a signal representing a first vibration waveform;

generate a signal representing a second vibration waveform; and output, to the vibrator, a signal representing the second vibration waveform before the condition is satisfied, reduce an amplitude of the second vibration waveform according to the condition being determined to be satisfied, and output, to the vibrator, a signal representing the first vibration waveform after a certain time has elapsed.

14. The information processing system according to claim 13, wherein an amplitude of the first vibration waveform is greater than an amplitude of the second vibration waveform.

15. A non-transitory storage medium having stored therein an information processing program executed by a computer of an information processing apparatus configured to vibrate a vibrator according to an input signal representing a vibration waveform, the program, when executed, causing the computer to at least:

perform information processing based on input from a controller;

generate a sound signal;

generate a signal representing a first vibration waveform; and based on the information processing, output the sound signal, and control the vibrator to vibrate in accordance with a signal representing a combined waveform obtained by combining (a) the first vibration waveform, with (b) an audio vibration waveform based on a waveform of the sound signal.

16. The storage medium according to claim 15, wherein the signal representing the combined waveform is output to the vibrator at a time when output of the sound signal is started.

17. The storage medium according to claim 15, wherein the program, when executed, is further configured to cause the computer to at least:

determine whether a condition is satisfied in the information processing, when a determination is made that the condition has been satisfied in the information processing,
generate the first vibration waveform,
generate the sound signal, and
output the sound signal and the signal representing the combined waveform, and when a determination is made that the condition is not satisfied in the information processing,
generate a second vibration waveform that is equal to the first vibration waveform, and
output a signal representing the second vibration waveform.

18. The storage medium according to claim 15, wherein the program, when executed, is further configured to cause the computer to at least:

determine whether a condition is satisfied in the information processing, when a determination is made that the condition has been satisfied in the information processing,
generate the first vibration waveform,
generate the sound signal, and
output the sound signal and the signal representing the combined waveform, and when a determination is made that the condition is not satisfied in the information processing,
generate a second vibration waveform that is different from the first vibration waveform, and
output a signal representing the second vibration waveform.

19. The storage medium according to claim 18, wherein the first vibration waveform is a waveform obtained by changing a frequency and/or an amplitude of the second vibration waveform.

20. The storage medium according to claim 15, wherein:

the controller includes an inertial sensor, and input from the controller includes data obtained from the inertial sensor, a determination is made as to whether a first virtual object contacts with a second virtual object in the information processing, based on the data obtained from the inertial sensor, the sound signal is output, and the signal representing the combined waveform is output to the vibrator, when a determination is made that the first virtual object has contacted with the second virtual object.

21. A non-transitory storage medium having stored therein an information processing program executable by a computer of an information processing apparatus configured to vibrate a vibrator according to an input signal representing a vibration waveform, the program, when executed, causing the computer to at least:

perform information processing based on input from a controller;

generate a signal representing a first vibration waveform for which a predetermined frequency is set; and output, to the vibrator, a signal representing a combined waveform obtained by combining (a) the first vibration waveform, with (b) an audio vibration waveform based on a waveform of a sound signal, based on the information processing.

22. A non-transitory storage medium having stored therein an information processing program executable by a computer of an information processing apparatus configured to vibrate a vibrator according to an input signal representing a vibration waveform, the program, when executed, causing the computer to at least:

determine whether a condition is satisfied, based on input from a controller;

generate a signal representing a first vibration waveform;

generate a signal representing a second vibration waveform; and output, to the vibrator, a signal representing the second vibration waveform before the condition is satisfied, reduce an amplitude of the second vibration waveform according to the condition being determined to be satisfied, and output, to the vibrator, a signal representing the first vibration waveform after a certain time has elapsed.

23. An information processing apparatus configured to vibrate a vibrator according to an input signal representing a vibration waveform, the information processing apparatus comprising at least one processor configured to at least:
perform information processing based on input from a controller;
generate a sound signal;
generate a signal representing a first vibration waveform; and
based on the information processing, output the sound signal, and control the vibrator to vibrate in accordance with a signal representing a combined waveform obtained by combining (a) the first vibration waveform, with (b) an audio vibration waveform based on a waveform of the sound signal.

24. An information processing method performed by an information processing system that vibrates a vibrator according to an input signal representing a vibration waveform, the information processing method comprising:
performing information processing based on input from a controller;
generating a sound signal;
generating a signal representing a first vibration waveform; and
outputting the sound signal, and outputting, to the vibrator, a signal representing a combined waveform obtained by combining the first vibration waveform and an audio vibration waveform based on a waveform of the sound signal, based on the information processing.

25. An information processing apparatus configured to vibrate a vibrator according to an input signal representing a vibration waveform, the information processing apparatus comprising at least one processor configured to at least:
perform information processing based on input from a controller;
generate a signal representing a first vibration waveform for which a predetermined frequency is set; and
output, to the vibrator, a signal representing a combined waveform obtained by combining the first vibration waveform and an audio vibration waveform based on a waveform of a sound signal, based on the information processing.

26. An information processing method performed by an information processing system that vibrates a vibrator according to an input signal representing a vibration waveform, the information processing method comprising:
performing information processing based on input from a controller;
generating a signal representing a first vibration waveform for which a predetermined frequency is set; and
outputting, to the vibrator, a signal representing a combined waveform obtained by combining the first vibration waveform and an audio vibration waveform based on a waveform of a sound signal, based on the information processing.

27. An information processing apparatus configured to vibrator a vibrator according to an input signal representing a vibration waveform, the information processing apparatus comprising at least one processor configured to at least:
determine whether a condition is satisfied, based on input from a controller;
generate a signal representing a first vibration waveform;
generate a signal representing a second vibration waveform; and
output, to the vibrator, a signal representing the second vibration waveform before the condition is satisfied, reduce an amplitude of the second vibration waveform according to the condition being determined to be satisfied, and output, to the vibrator, a signal representing the first vibration waveform after a certain time has elapsed.

28. An information processing method performed by an information processing system that vibrates a vibrator according to an input signal representing a vibration waveform, the information processing method comprising:
determining whether a condition is satisfied, based on input from a controller;
generating a signal representing a first vibration waveform;
generating a signal representing a second vibration waveform; and
outputting, to the vibrator, a signal representing the second vibration waveform before the condition is satisfied, reducing an amplitude of the second vibration waveform according to the condition being determined to be satisfied, and outputting, to the vibrator, a signal representing the first vibration waveform after a certain time has elapsed.

* * * * *